(12) United States Patent
Slafter et al.

(10) Patent No.: US 8,448,657 B2
(45) Date of Patent: May 28, 2013

(54) PASSIVE-CYCLE SKIPPING VALVE

(75) Inventors: Michael Edwin Slafter, Ivins, UT (US); Randal Edward Zugnoni, Dublin, CA (US)

(73) Assignee: Red Mountain Engineering LLC, St. George, UT (US)

( * ) Notice: Subject to any disclaimer, the term of this patent is extended or adjusted under 35 U.S.C. 154(b) by 484 days.

(21) Appl. No.: 12/767,063

(22) Filed: Apr. 26, 2010

(65) Prior Publication Data
US 2011/0259427 A1 Oct. 27, 2011

(51) Int. Cl.
*F17D 3/00* (2006.01)
(52) U.S. Cl.
USPC ............. 137/1; 137/624.15; 137/624.11; 137/624.2; 239/70
(58) Field of Classification Search
USPC ............ 137/624.11, 624.13, 624.14, 624.18, 137/624.2, 1, 624.15; 239/66, 70; 251/230, 251/325; 74/575
See application file for complete search history.

(56) References Cited

U.S. PATENT DOCUMENTS

| | | | | |
|---|---|---|---|---|
| 3,480,034 | A * | 11/1969 | Jerome | 137/119.03 |
| 3,693,658 | A * | 9/1972 | De Bruyne et al. | 137/624.18 |
| 3,747,620 | A * | 7/1973 | Kah, Jr. | 137/119.03 |
| 3,853,145 | A * | 12/1974 | Judd | 137/624.18 |
| 4,000,645 | A | 1/1977 | Dower | |
| 4,116,216 | A * | 9/1978 | Rosenberg | 137/624.13 |
| 4,304,262 | A * | 12/1981 | Icking | 137/624.2 |
| 4,359,983 | A | 11/1982 | Carlson et al. | |
| 4,407,451 | A * | 10/1983 | Hunter | 239/66 |
| 4,632,361 | A * | 12/1986 | Callison | 251/230 |
| 4,813,749 | A | 3/1989 | Cilles | |
| 5,950,672 | A | 9/1999 | Jauhola et al. | |
| 6,227,455 | B1 * | 5/2001 | Scott et al. | 239/1 |
| 6,280,159 | B1 | 8/2001 | Agner et al. | |
| 6,513,468 | B2 | 2/2003 | Takahashi et al. | |
| 6,619,248 | B1 | 9/2003 | Bertelshofer et al. | |
| 6,622,933 | B1 * | 9/2003 | Young et al. | 239/66 |
| 6,729,696 | B2 | 5/2004 | Kemer et al. | |
| 6,827,050 | B2 | 12/2004 | Cotton, III et al. | |
| 6,827,288 | B2 * | 12/2004 | Noelke | 239/124 |
| 7,178,489 | B2 | 2/2007 | Tanaka | |
| 7,648,053 | B2 * | 1/2010 | Rose et al. | 222/594 |
| 2004/0155210 | A1 | 8/2004 | Wears et al. | |

FOREIGN PATENT DOCUMENTS

| | | |
|---|---|---|
| DE | 3807699 A1 | 9/1989 |
| JP | 1-164876 A | 6/1989 |
| JP | 9-88910 A | 3/1997 |

OTHER PUBLICATIONS

Ayala, Eduardo: "Convenient Procedure to Convert Two Cycle Diesel Engines into Hot Gas Engines Whereby the Displacer Piston is Actuated by Gas Pressure Changes Combined with Spring Force Actuators", Proceedings of the Intersociety Energy Conversion Engineering Conference, 1985, pp. 344-348.

Miyakawa, Shimpei, "Stability of a Hydraulic Circuit with a Counter-Balance Valve", The Japan Society of Mechanical Engineers, Bulletin of the JSME, vol. 21, No. 162, Dec. 1978, pp. 1750-1756.

* cited by examiner

*Primary Examiner* — Kevin L. Lee
*Assistant Examiner* — R. K. Arundale
(74) *Attorney, Agent, or Firm* — Nikia L. Gray; Dale Regelman; Quarles & Brady LLP

(57) ABSTRACT

A passive cycle skipping valve comprising a pawl and a wheel comprising a first plurality of pins, wherein a distal end of the pawl is configured to engage any of the first plurality of pins where when the second pin is separated from the first pin by at least a threshold pin separation distance, the valve opens and when the second pin is not separated from the first pin by at least the threshold pin separation distance, the valve does not open.

29 Claims, 22 Drawing Sheets

PASSIVE-CYCLE SKIPPING VALVE

FIELD OF THE INVENTION

Various implementations, and combinations thereof, are related to fluid valves and, more particularly, to passive cycle-skipping fluid valves.

BACKGROUND OF THE INVENTION

Fluid valves work by allowing and disallowing flow through the valve or, in the case of directional control valves, by directing the flow to alternating ports. In typical on/off valves there are three connection points: an input port where pressurized fluid is connected, an outlet port where fluid will flow when the valve is open, and an actuator connection point where a mechanical device causes the valve to open and close. Opening and closing of the valve can be accomplished via manual means, such as a home faucet, electrical means where an electrical signal actuates a solenoid, pneumatic means where compressed air (or gasses) actuate a diaphragm or piston, or hydraulic means where pressurized hydraulic fluid actuates a diaphragm or piston. In all of these cases the manual lever, electronic solenoid, pneumatic diaphragm or hydraulic diaphragm or piston move a part within the valve causing the valve to open or close. In all of these cases an external force or signal is required to make the valve switch between open and closed states.

SUMMARY OF THE INVENTION

In one implementation, a passive cycle skipping valve is presented. The passive cycle skipping valve comprises a pawl and a wheel comprising a first plurality of pins, wherein a distal end of the pawl is configured to engage any of the first plurality of pins where when the second pin is separated from the first pin by at least a threshold pin separation distance, the valve opens and when the second pin is not separated from the first pin by at least the threshold pin separation distance, the valve does not open.

In another implementation, a system is presented comprising a passive cycle skipping valve and a plurality of fluid emitters, wherein the passive cycle skipping valve controls the emission of at least one of the plurality of fluid emitters. The passive cycle skipping valve comprises a pawl and a wheel comprising a first plurality of pins, wherein a distal end of the pawl is configured to engage any of the first plurality of pins where when the second pin is separated from the first pin by at least a threshold pin separation distance, the valve opens and when the second pin is not separated from the first pin by at least the threshold pin separation distance, the valve does not open.

In yet another implementation, a method is presented for delivering a fluid from a pressurized line while skipping one or more pressure cycles. The method comprises disposing on a distal end of a conduit conveying a fluid having a first pressure, a passive cycle skipping valve comprising a pawl and a wheel comprising a first plurality of pins, wherein a distal end of said pawl engages a first pin of the first plurality of pins, rotating the wheel until a second pin of the first plurality of pins contacts the pawl, opening the valve when the second pin is separated from the first pin by at least a threshold pin separation distance, and not opening the valve when the second pin is not separated from the first pin by at least said threshold pin separation distance.

BRIEF DESCRIPTION OF THE DRAWINGS

Implementations of the invention will become more apparent from the detailed description set forth below when taken in conjunction with the drawings, in which like elements bear like reference numerals.

DETAILED DESCRIPTION OF THE PREFERRED EMBODIMENTS

Throughout the following description, this invention is described in preferred embodiments with reference to the figures in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment, "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
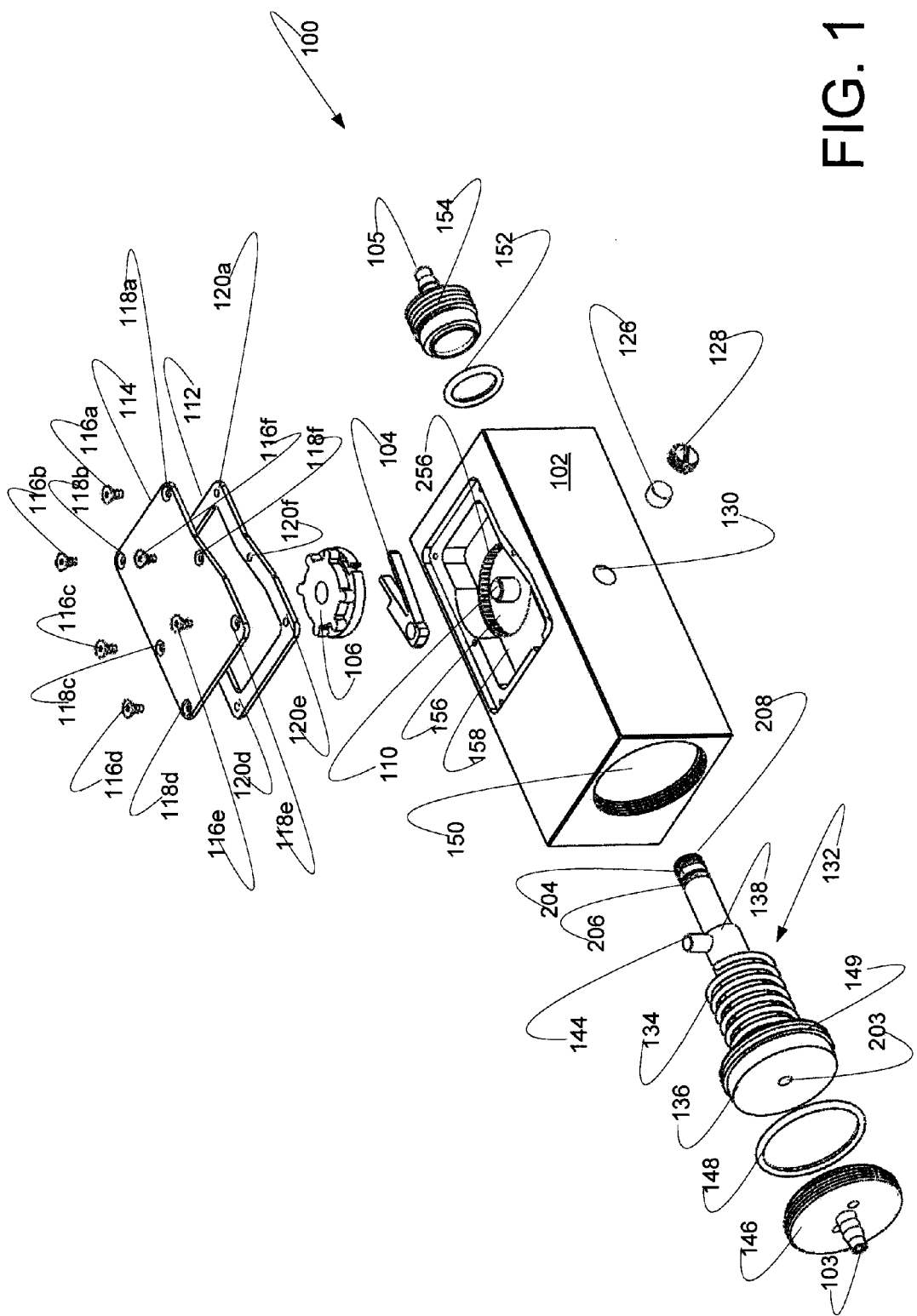
FIG. 1 is an exploded view of an exemplary embodiment of Applicants' passive cycle skipping valve.

FIG. 1 is an exploded view of an exemplary embodiment of Applicants' passive cycle skipping (PCS) valve 100 which allows output flow on predetermined pressure cycle intervals without an external pilot signal, the operation of PCS valve 100 being dependent only upon the pressurization and depressurization of the main supply line itself. As can be seen in the illustrated embodiment of FIG. 1, PCS valve 100 comprises piston rod assembly 132, indexing wheel 106, indexing wheel pivot pin 110, pawl 104 having an integral return spring 212 (FIG. 3), inlet fitting 146, and outlet fitting 154 housed within valve body 102. As will be appreciated by one of ordinary skill in the art, a pawl is a component that allows continuous linear or rotary motion in only one direction while preventing motion in the opposite direction. Furthermore, it will be understood that the use of "wheel" for indexing wheel 106 is not limiting and includes any rotating part capable of performing the same function, such as, and without limitation, a gear, pinion, and spur wheel.

Figure 9A:
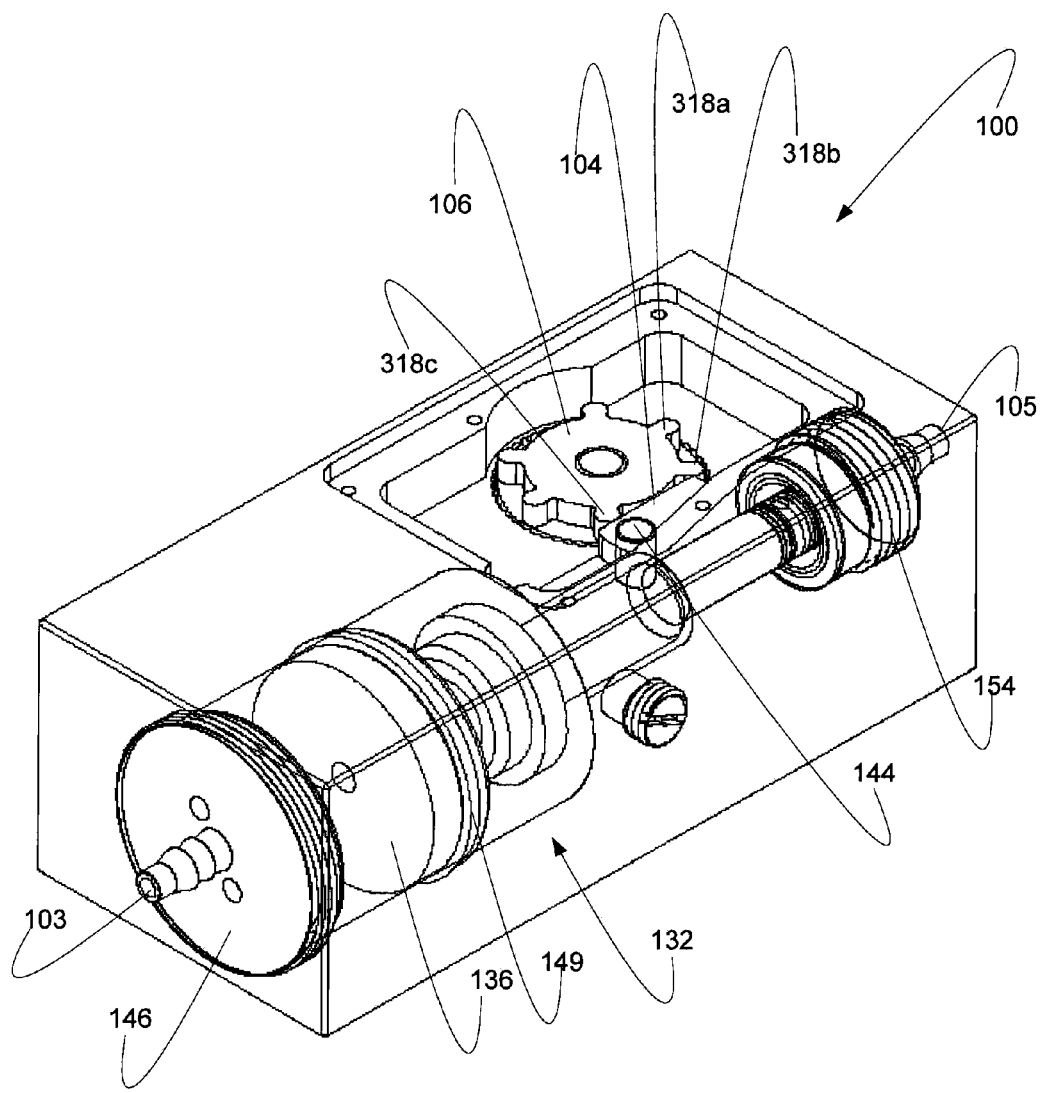
FIG. 9A is a perspective view of an exemplary diagram of the passive cycle skipping valve of FIG. 1 in a flow position wherein flow is allowed.
Figure 9B:
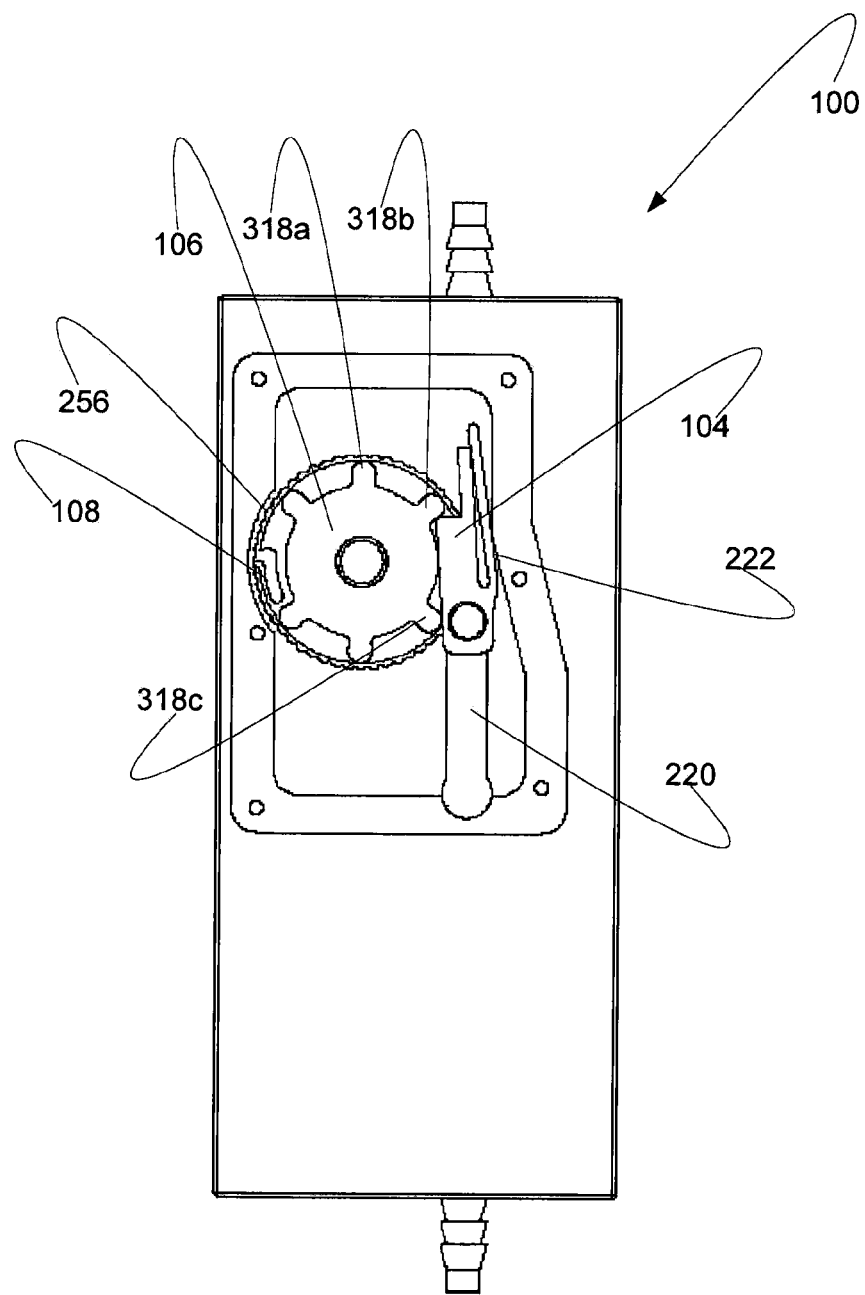
FIG. 9B is a front view of the passive cycle skipping valve of FIG. 9A.
Figure 9C:
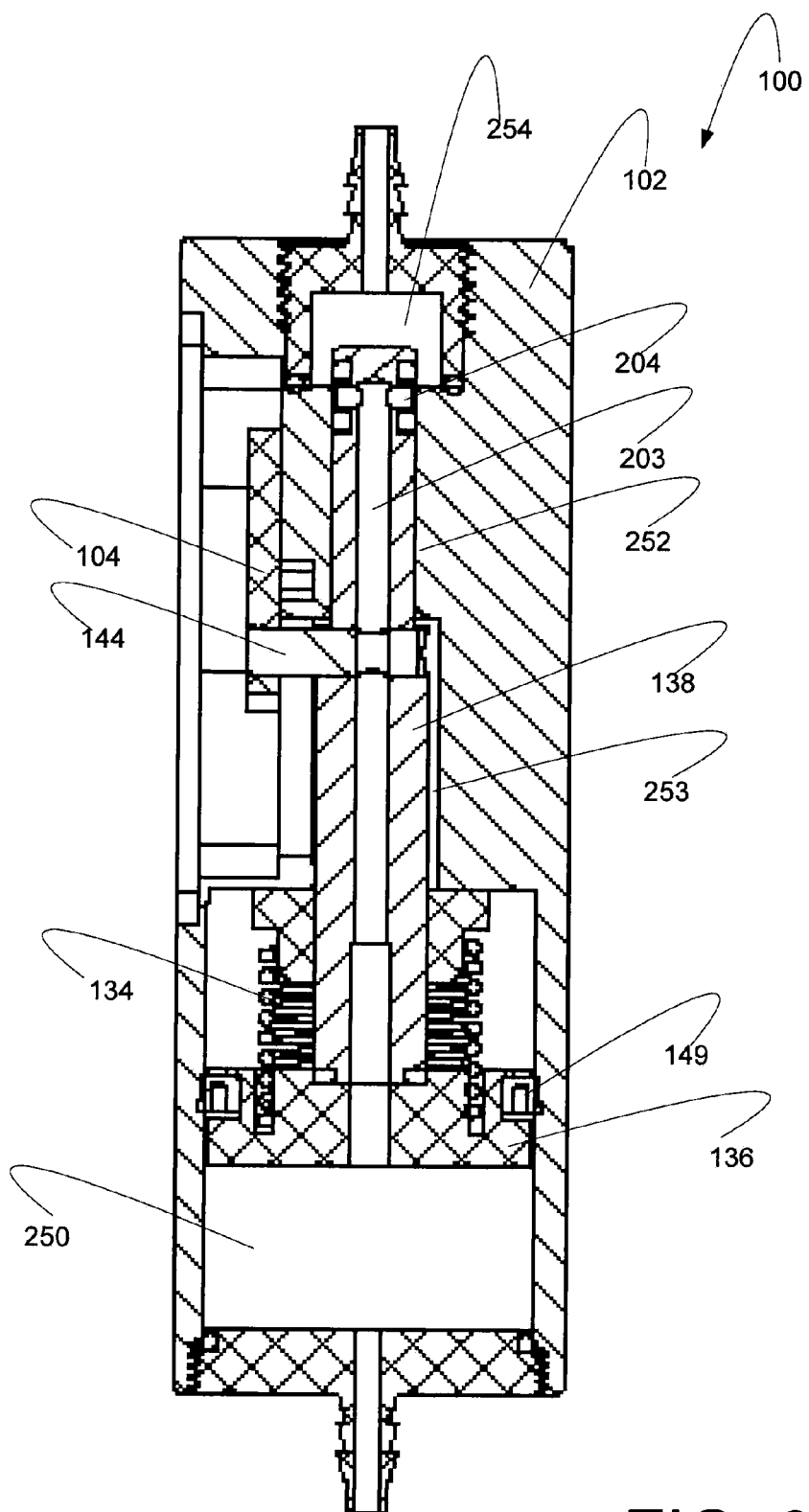
FIG. 9C is a cross-section view of the passive cycle skipping valve of FIG. 9A.

Valve body 102 is formed to include cavity 150 extending therethrough, wherein piston rod assembly 132 is disposed within cavity 150. A cross-section of valve body 102 showing cavity 150 is depicted in FIGS. 6C and 9C. As can be seen in the cross-section view of FIGS. 6C and 9C, cavity 150 comprises piston bore 250, piston rod bore 252, clearance bore 253, and exit bore 254. As shown in FIG. 1, cavity 150 is sealed by inlet fitting 146 having o-ring 148 and outlet fitting 154 having o-ring 152. Air filter 126 and vent retainer 128 are disposed within opening 130 of valve body 102.

Figure 3:
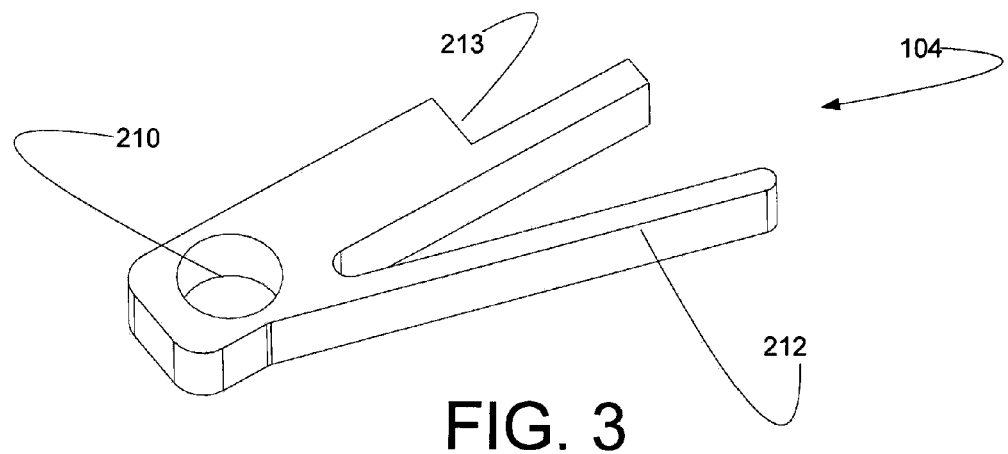
FIG. 3 is an exemplary diagram of the pawl of the passive cycle skipping valve of FIG. 1.
Figure 4A:
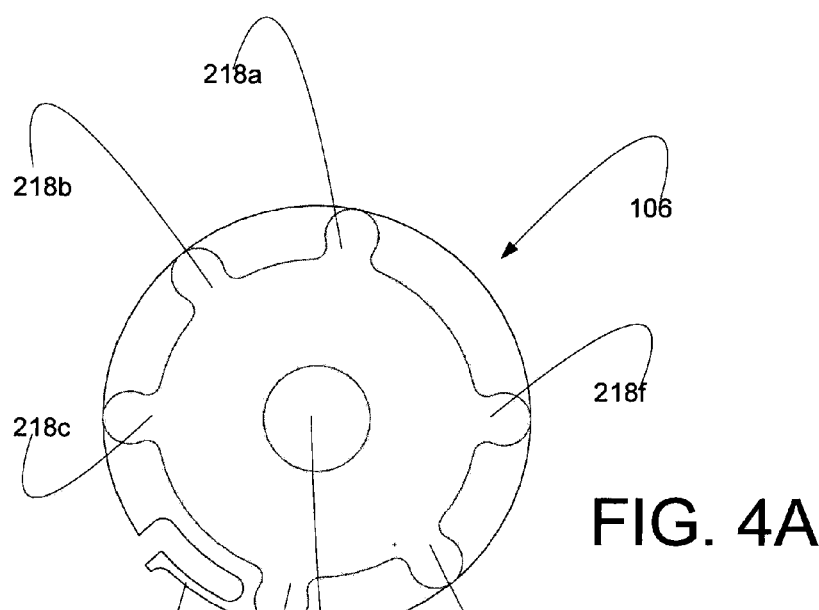
FIGS. 4A and 4B are exemplary diagrams of the indexing wheel of the passive cycle skipping valve of FIG. 1.
Figure 4B:
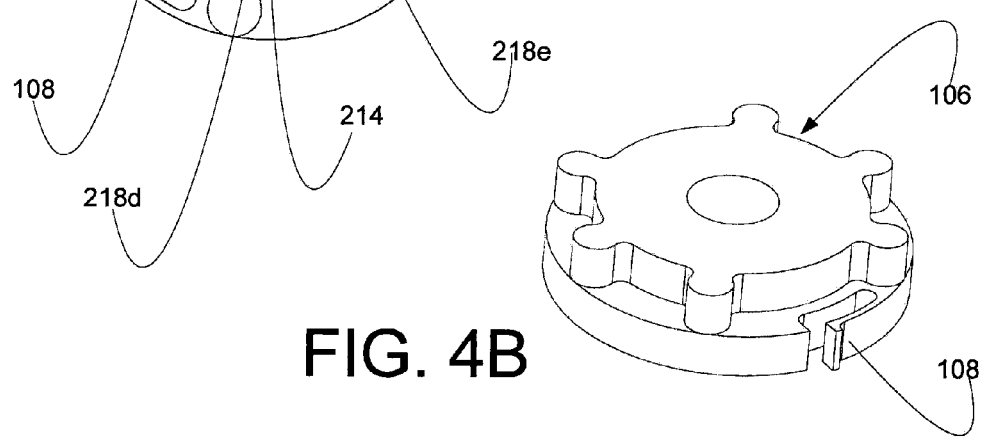
Figure 5:
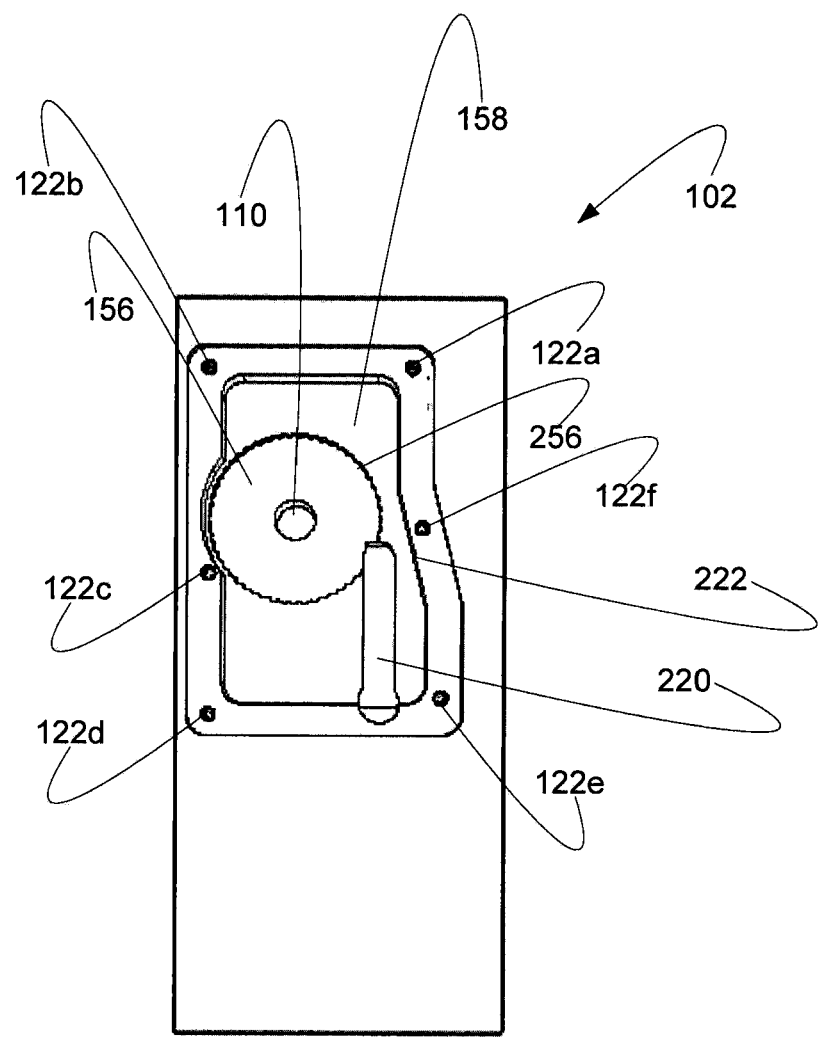
FIG. 5 is an exemplary diagram of the valve body of the passive cycle skipping valve of FIG. 1.

Referring now to FIG. 5, valve body 10 is further formed to include recess 158 having counter-bore 156, wheel pivot pin 110, and aperture 220, wherein aperture 220 communicates with piston rod bore 252. As can be seen in the illustrated embodiment of FIG. 1, indexing wheel 106 sits within counter-bore 156 such that wheel pivot pin 110 extends through aperture 214 (FIGS. 4A and 4B) of indexing wheel 106 and rotateably secures indexing wheel 106 within counter-bore 156. Periphery 256 of counter-bore 156 is ratcheted such that anti-rotational spring 108 (FIGS. 4A and 4B) of indexing wheel 106 engages ratcheted periphery 256 of counter-bore 156, as will be discussed in greater detail below. Pawl 104 sits within recess 158 such that bore 210 (FIG. 3) of pawl 104 is aligned with aperture 220, wherein pawl pivot pin 144 of piston rod assembly 132 extends through aperture 220 and bore 210 to movably secure pawl 104 to piston rod assembly 132. Notch 213 (FIG. 3) of pawl 104 abuts one of the pins 218 (*a*)-218(*f*) (FIGS. 4A and 4B) of indexing wheel 106 while integral return spring 212 abuts wall 222 (FIGS. 5, 7B, and 9B) of recess 158. Pawl 104 is illustrated in FIG. 3. A front view and perspective view of indexing wheel 106 is presented in FIGS. 4A and 4B respectively.

As shown in FIG. 1, cover 114 and gasket 112 sit flush with valve body 102 and are secured to valve body 102 by screws 116(*a*)-116(*f*) inserted through blind apertures 118(*a*)-118(*f*) and apertures 120(*a*)-120(*f*) and into internally threaded apertures 122(*a*)-122(*f*) (FIG. 5).

Figure 2:
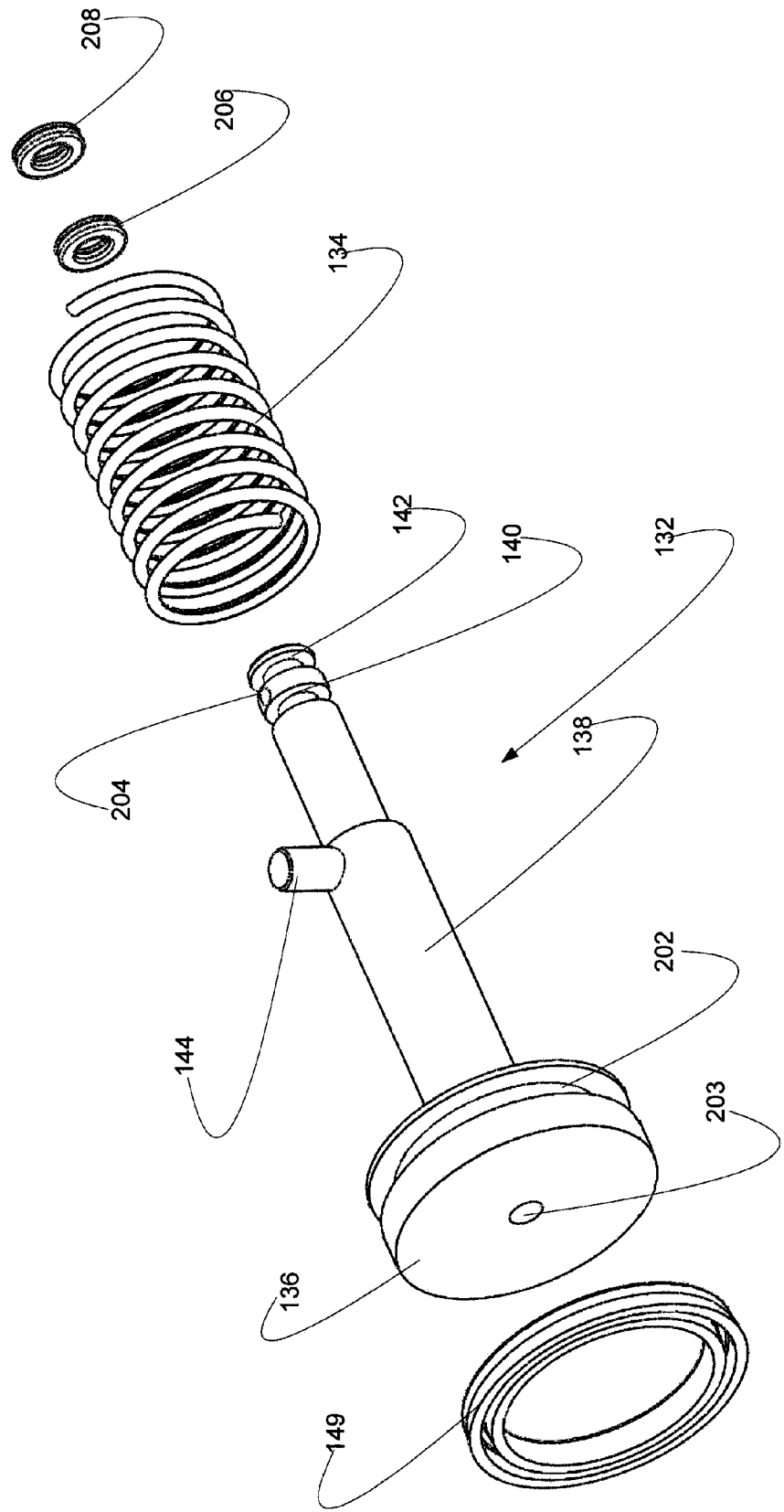
FIG. 2 an exploded view of the piston rod assembly of FIG. 1.

Turning to FIG. 2, an exploded view of Applicants' piston rod assembly 132 is presented. As can be seen in FIG. 2, piston rod assembly 132 comprises piston rod 138 having pawl pivot pin 144 extending outwardly therefrom. Piston 136 is attached to a first end of piston rod 138, wherein piston 136 is formed to include annular groove 202 for seal 149. A second end of piston rod 138 is formed to include annular grooves 140 and 142 for o-rings 206 and 208, respectively. Return spring 134 fits around piston rod 138 and sits between piston 136 and pawl pivot pin 144.

Piston rod assembly 132 further includes fluid passage 203 and fluid passage hole 204. Fluid passage 203 is drilled concentric to the outside diameter of piston 136 and extends the length of piston rod assembly 132 intersecting with fluid passage hole 204, wherein fluid passage hole 204 extends inwardly between o-rings 206 and 208. Fluid passage 203 and fluid passage hole 204 allow fluid to flow through PCS valve 100 when valve 100 is in an open "flow" position, as will be described in greater detail below.

In certain embodiments, fluid passage hole 204 intersects fluid passage 203 at a right angle. In other embodiments, fluid passage hole 204 intersects fluid passage 203 at an angle less than a right angle. In certain embodiments, piston rod assembly 132 comprises a plurality of fluid passage holes, each intersecting fluid passage 204.

Applicants' PCS valve 100 can be used with all fluids compatible with the materials of construction. PCS valve 100 can be made from several types of non-reactive elements to accommodate various fluids. Applicants' PCS valve 100 can also operate in pneumatic circuits. For the purpose of this description, the term "fluid" will be understood to refer to all fluids that can be used with Applicants' PCS valve 100 including, but not limited to, gases, air, water, and hydraulic fluid.

Figure 15A:
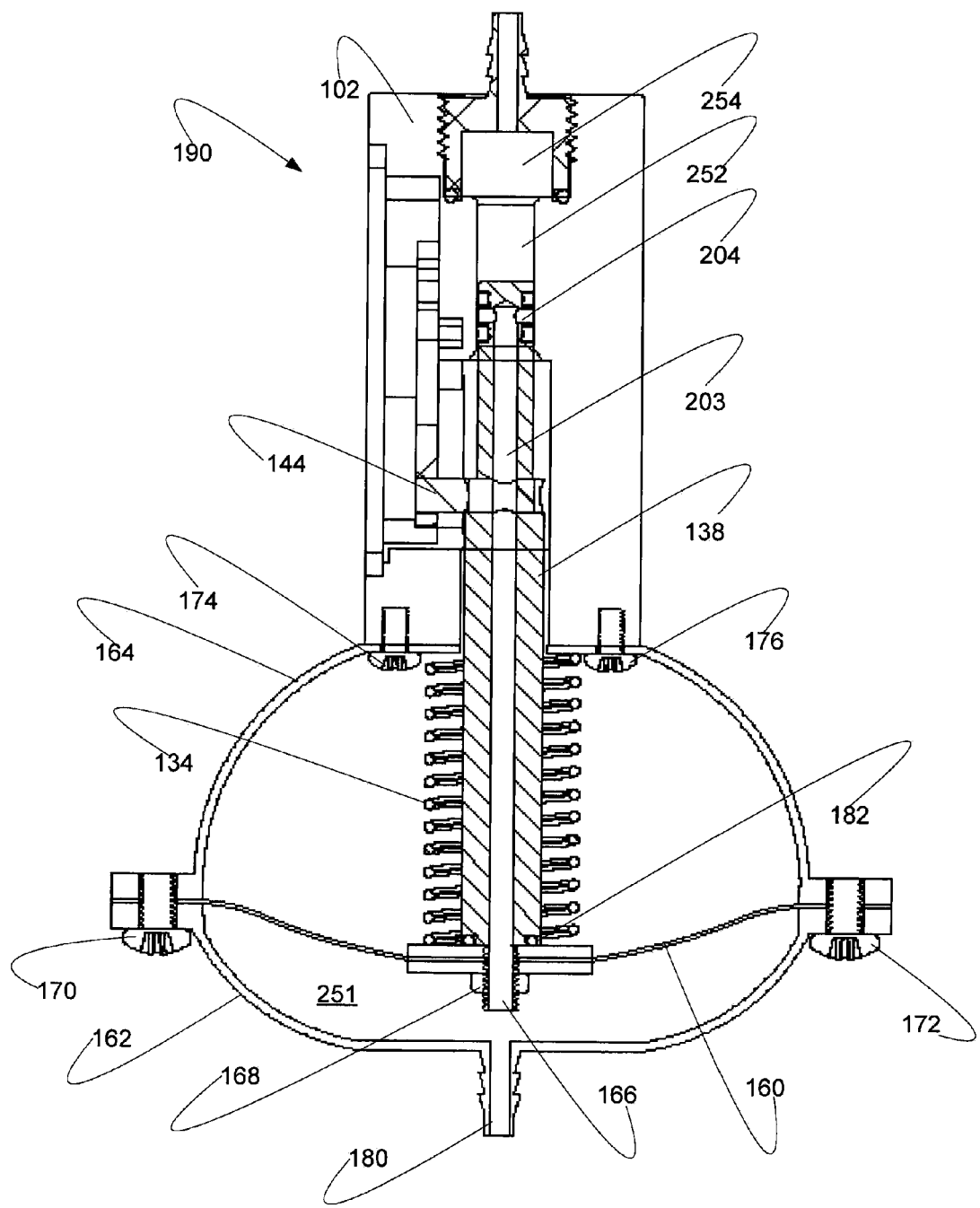
FIG. 15A is a cross-section view of an alternative embodiment of Applicants' passive cycle skipping valve having a diaphragm and in the closed position.
Figure 15B:
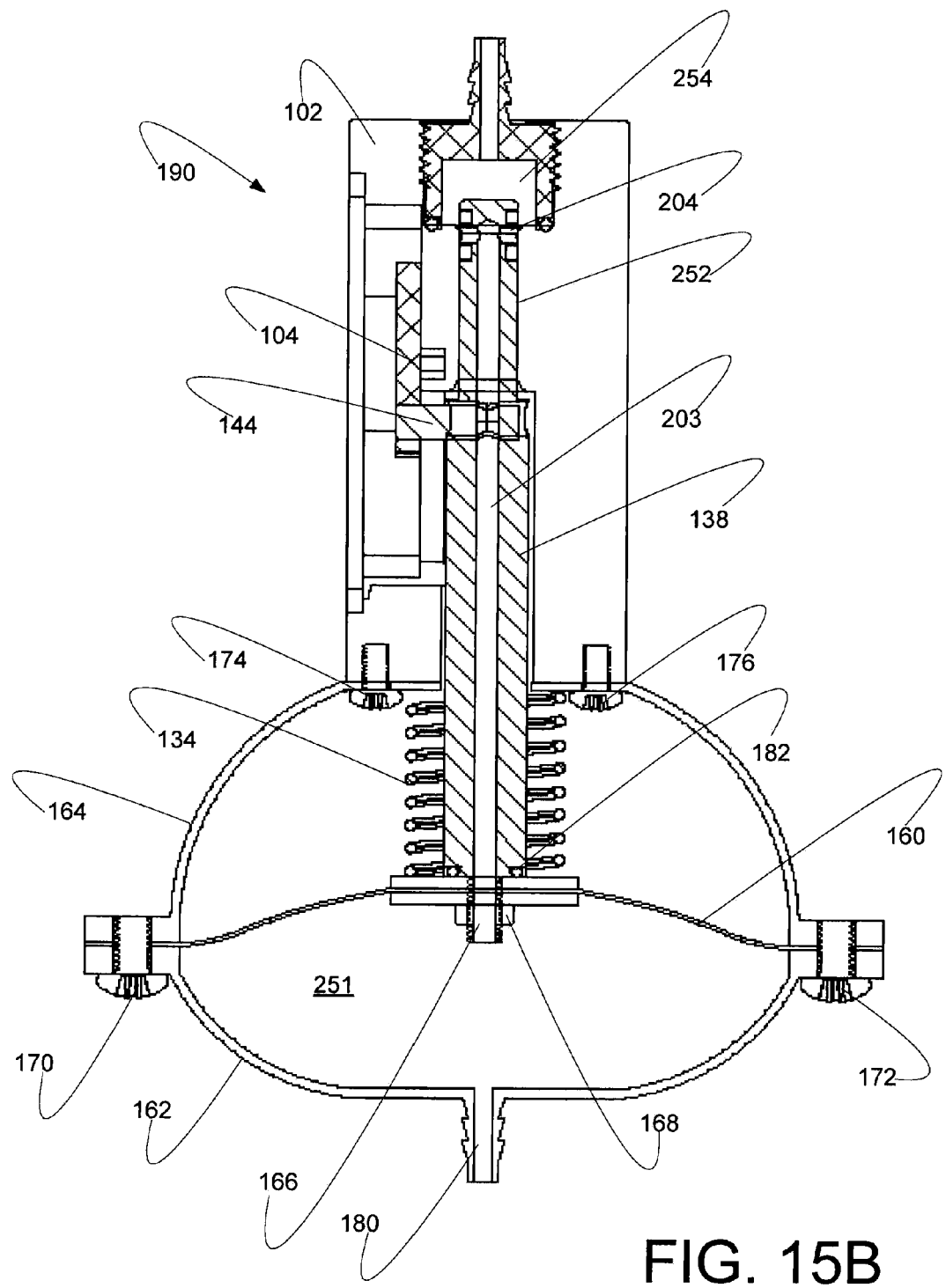
FIG. 15B is a cross-section view of the passive cycle skipping valve of FIG. 15A in the flow position.

An alternative embodiment of Applicant's passive cycle skipping valve is presented in FIGS. 15A and 15B utilizing a diaphragm rod assembly. More specifically, FIG. 15A depicts alternative passive cycle skipping valve 190 in the closed, or no-flow, position and FIG. 15B depicts alternative passive cycle skipping valve 190 in the open, or flow, position. As can be seen in the illustrated embodiments of FIGS. 15A and 15B, passive cycle skipping valve 190 comprises diaphragm 160 positioned between diaphragm cover 162 and diaphragm bell 164 and secured to rod 138 via threaded extension 166, nut 168, and o-ring 182. Diaphragm 160, diaphragm cover 162, and diaphragm bell 164 are attached to one another via screws 170 and 172, and to body 102 via screws 174 and 176. In certain embodiments, additional screws may be employed as needed.

As is depicted in FIG. 15B, as fluid enters via inlet 180 and fills chamber 251, diaphragm 160 flexes and compresses spring 134 (FIGS. 1, 2, 15A, 15B) moving rod 138 (FIGS. 1, 2, 15A, 15B) laterally in piston rod bore 252 (FIGS. 6C, 9C, 15A, 15B) such that fluid passage hole 204 (FIGS. 2, 6C, 9C, 10, 15A, 15B) is within exit bore 254 (FIGS. 6C, 9C, 10, 15A, 15B) allowing flow to pass through fluid passage 203 (FIGS. 2, 6C, 9C, 10, 15A, 15B) and into exit bore 254.

Applicants' valve 100 is a passive counter skipping valve, allowing output flow on predetermined pressure cycle intervals without an external pilot signal. Rather, PCS valve 100 mechanically "counts" the pressurization and depressurization cycles of the supply line, allowing output flow after a predetermined number of cycles have lapsed. FIGS. 6, 7, 8, and 9 illustrate the flow cycle of Applicants' PCS valve 100.

Figure 6A:
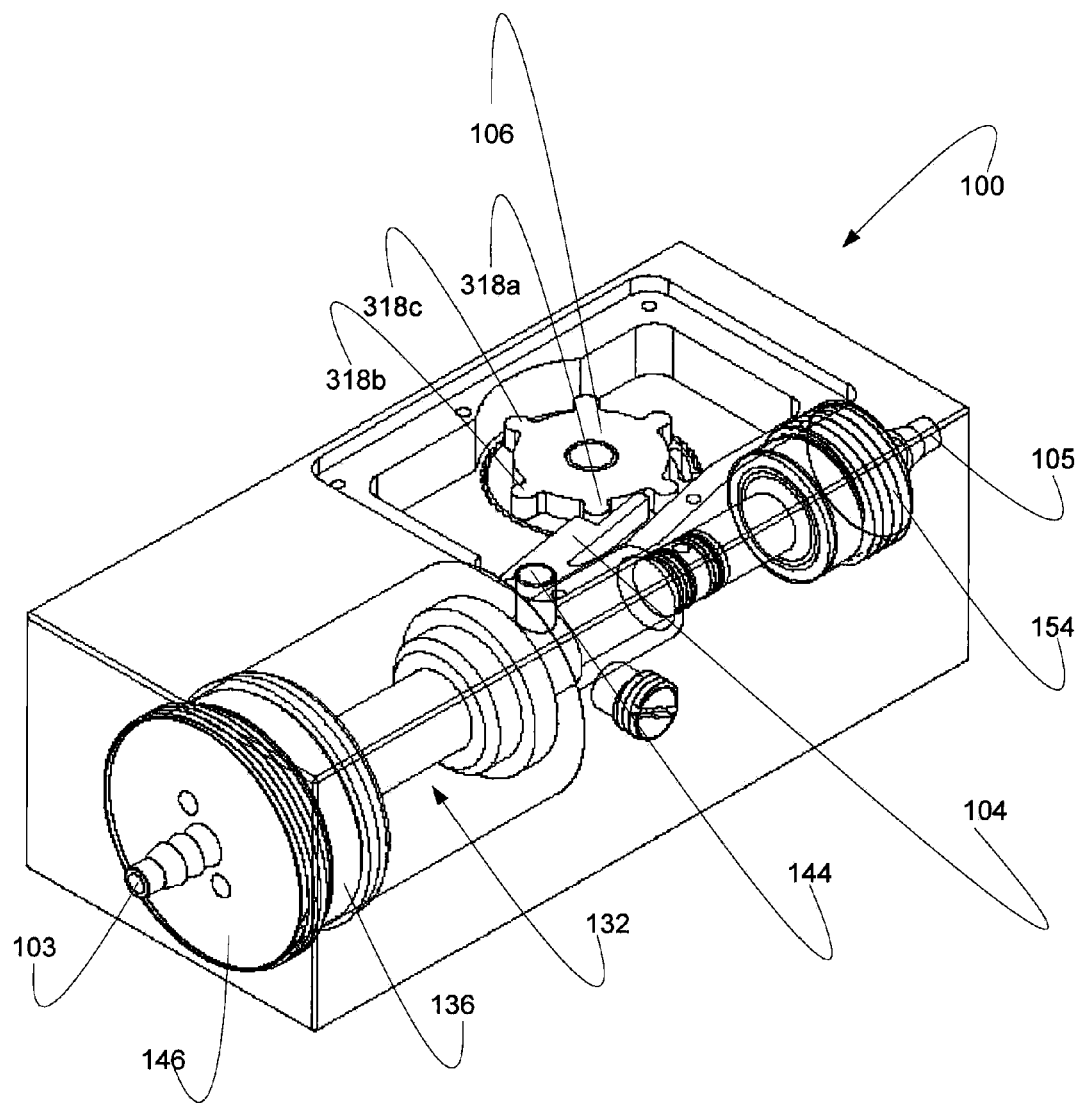
FIG. 6A is a perspective view of an exemplary diagram of the passive cycle skipping valve of FIG. 1 in a first home position, or a non-pressurized state.
Figure 6B:
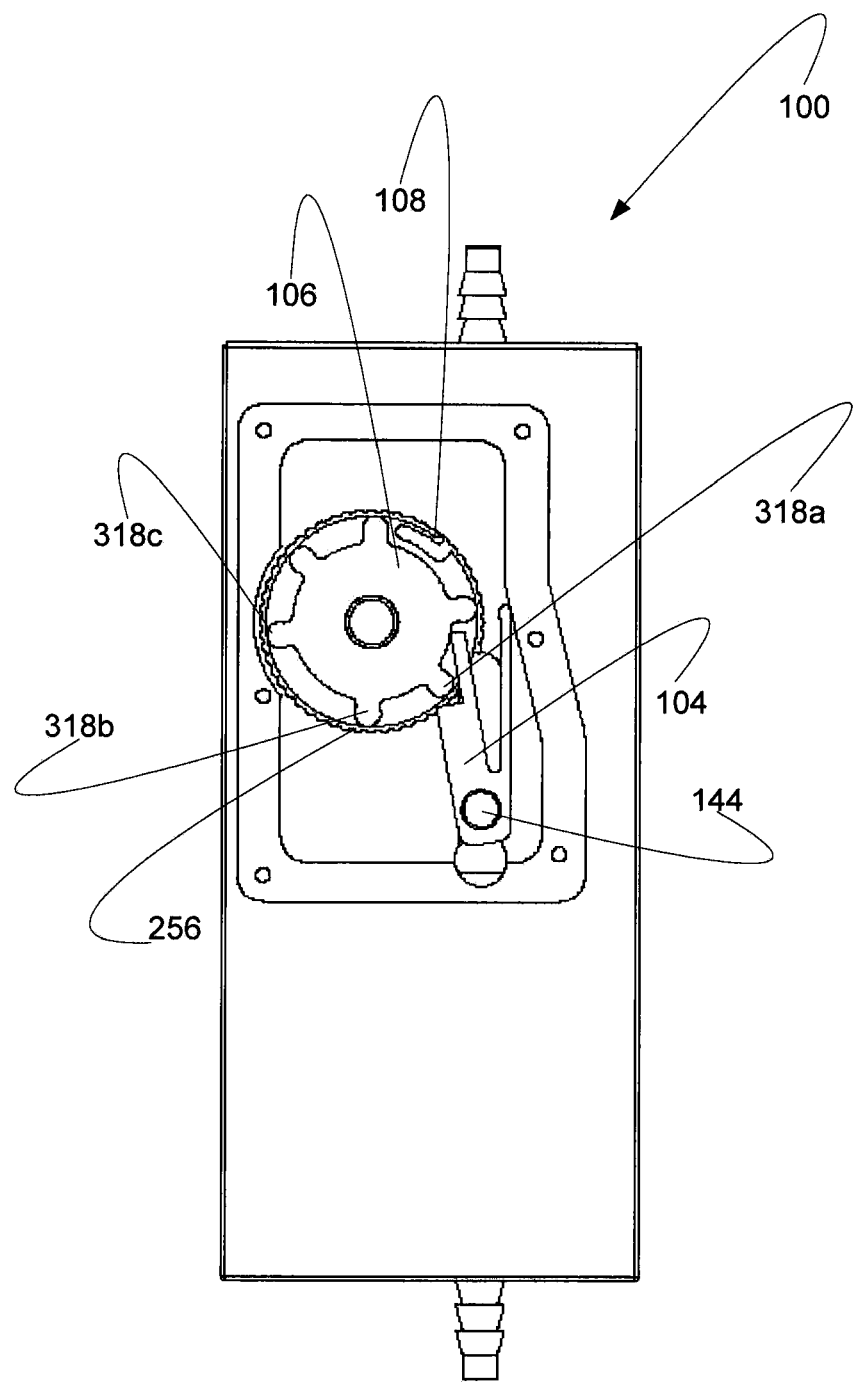
FIG. 6B is a front view of the passive cycle skipping valve of FIG. 6A.
Figure 6C:
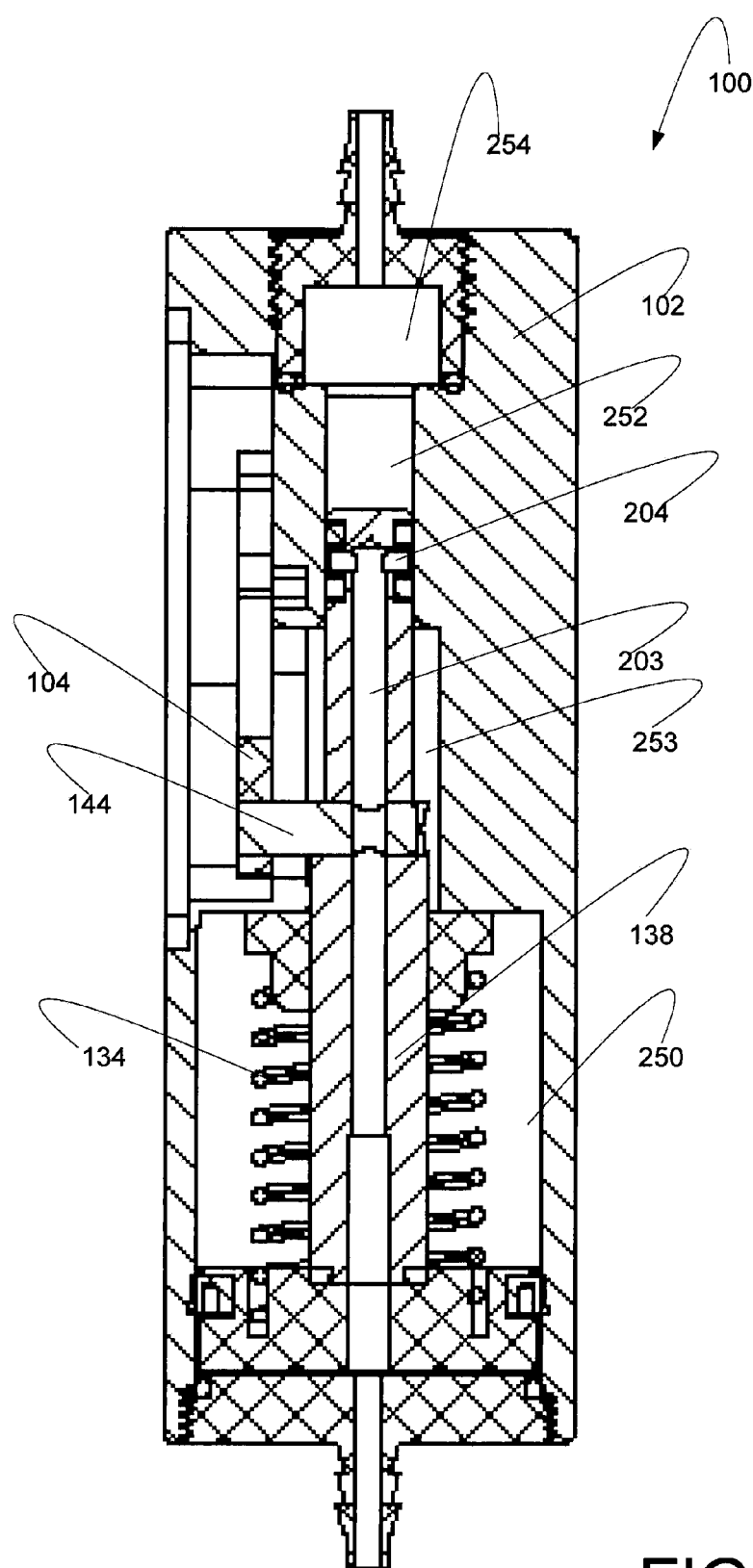
FIG. 6C is a cross-section view of the passive cycle skipping valve of FIG. 6A.

FIGS. 6A, 6B, and 6C illustrate PCS valve 100 in a non-pressurized state. This is referred to as a "home position" of PCS valve 100. As pressure is applied to inlet fitting 146 via a line connected to connection 103, return spring 134 (depicted only in FIG. 6C for clarity) compresses and piston rod assembly 132 moves towards outlet fitting 154. Pawl 104 attached to pawl pivot pin 144 of piston rod assembly 132 is moved linearly and notch 213 engages pin 318(*a*) on indexing wheel 106, the linear movement of pawl 104 causing indexing wheel 106 to rotate counter-clockwise. This counter-clockwise motion continues until pin 318(*b*) of indexing wheel 106 is pushed up against pawl 104 as depicted in FIGS. 7A and 7B.

Figure 7A:
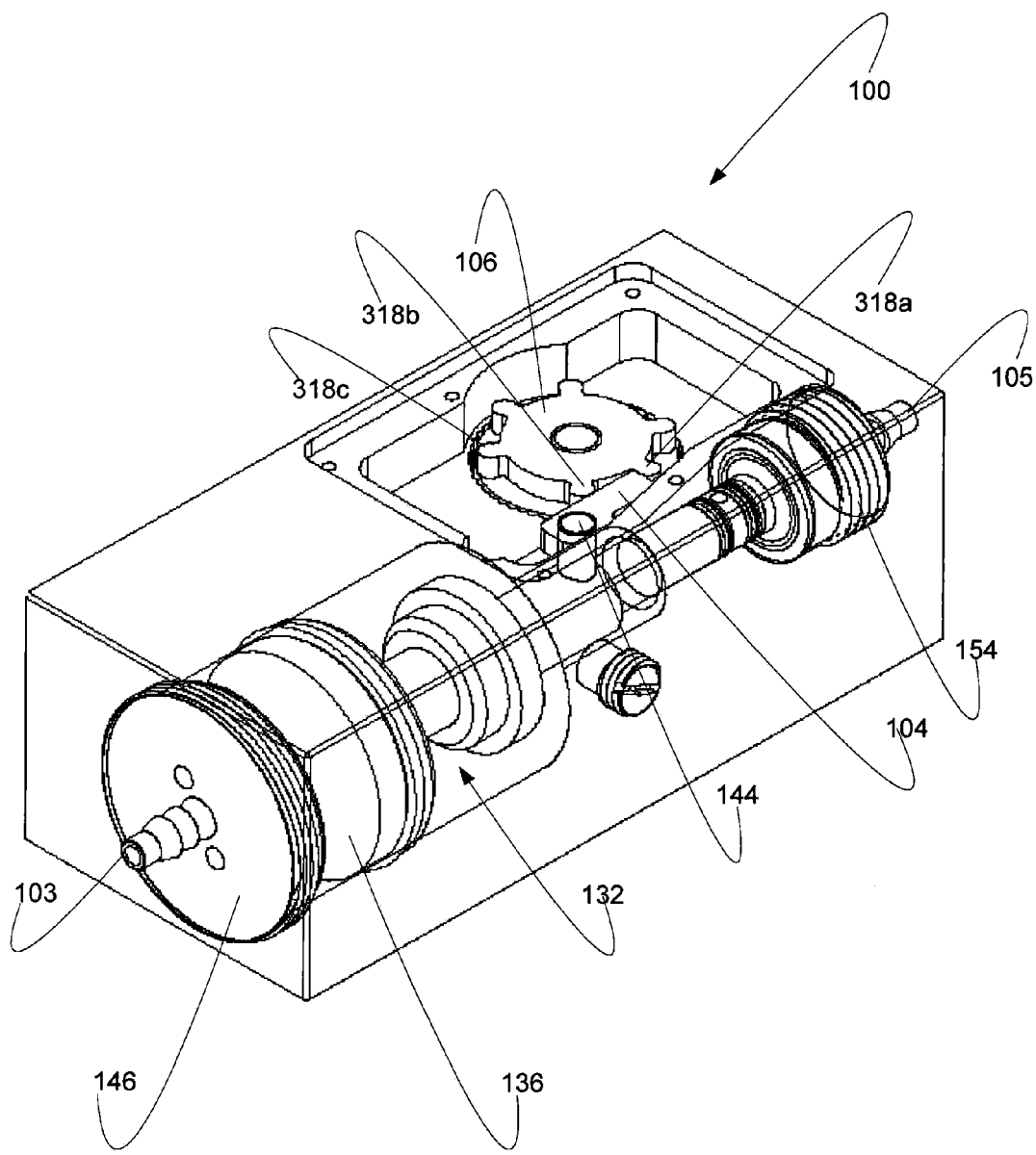
FIG. 7A is a perspective view of an exemplary diagram of the passive cycle skipping valve of FIG. 1 in a trapped position, where no flow is allowed.
Figure 7B:
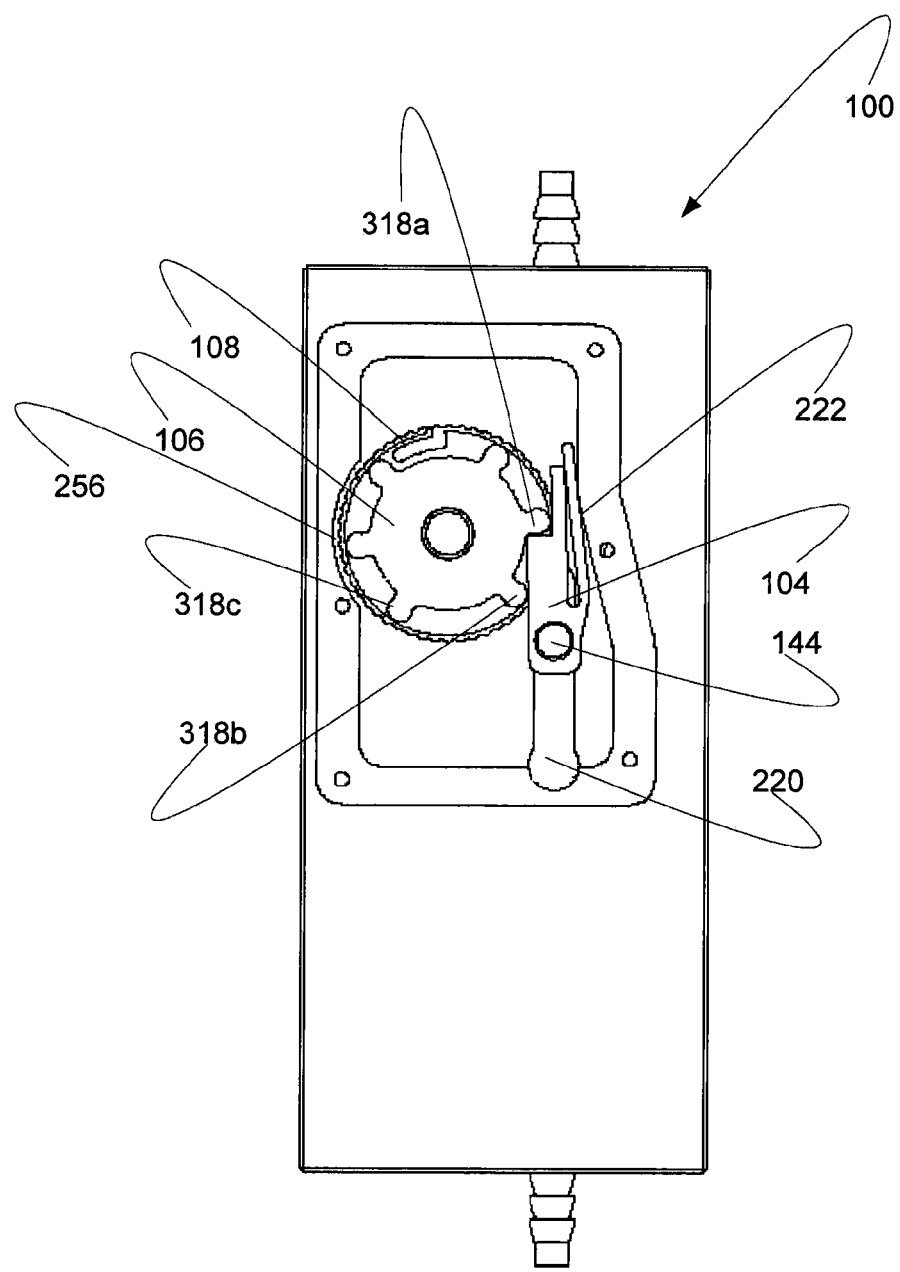
FIG. 7B is a front view of the passive cycle skipping valve of FIG. 7A.

As can be seen in the illustrated embodiment of FIGS. 7A and 7B, pawl 104 is trapped between pin 318(*a*), pin 318(*b*), and wall 222 of recess 158, preventing further rotation of indexing wheel 106 and liner movement of piston rod assembly 132. In this non-flow position, referred to as the "trapped position," piston rod o-rings 206 and 208 are both disposed within piston rod bore 252 thereby preventing fluid flow either out of the valve exit path or backwards toward the valve inlet fitting. The trapped position is maintained as long as fluid pressure is maintained in the supply line. When the pressure in the supply line decreases, return spring 134 (not depicted) decompresses, pushing piston 136 toward inlet fitting 146 and PCS valve 100 is returned to the home position. Anti-rotational spring 108 of indexing wheel 106 engages the ratcheted periphery 256 of counter-bore 156, preventing indexing wheel 106 from rotating in a clockwise direction during the retraction stroke of piston rod assembly 132.

Figure 8A:
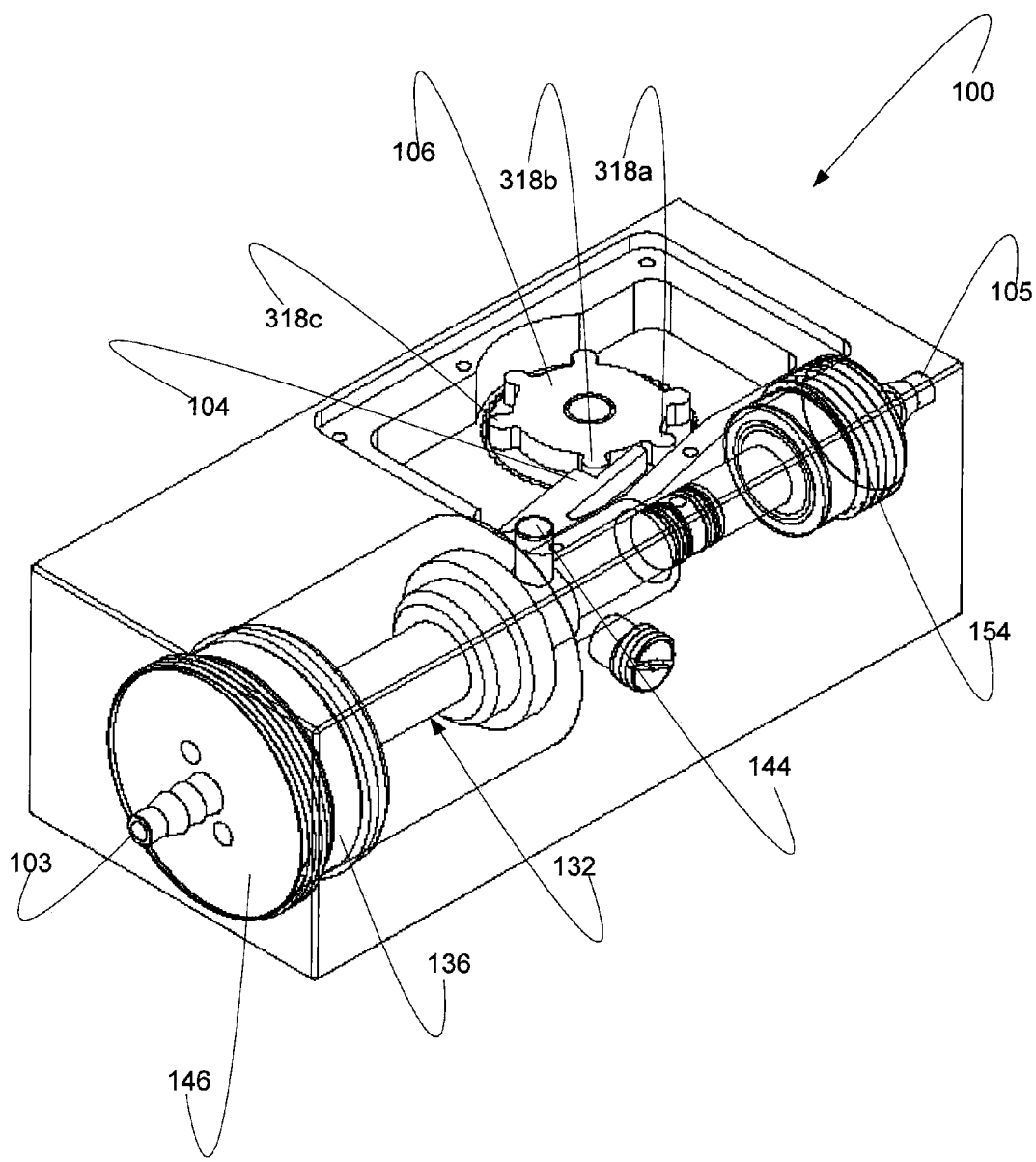
FIG. 8A is a perspective view of an exemplary diagram of the passive cycle skipping valve of FIG. 1 in a second home position, where flow will be allowed upon pressurization.
Figure 8B:
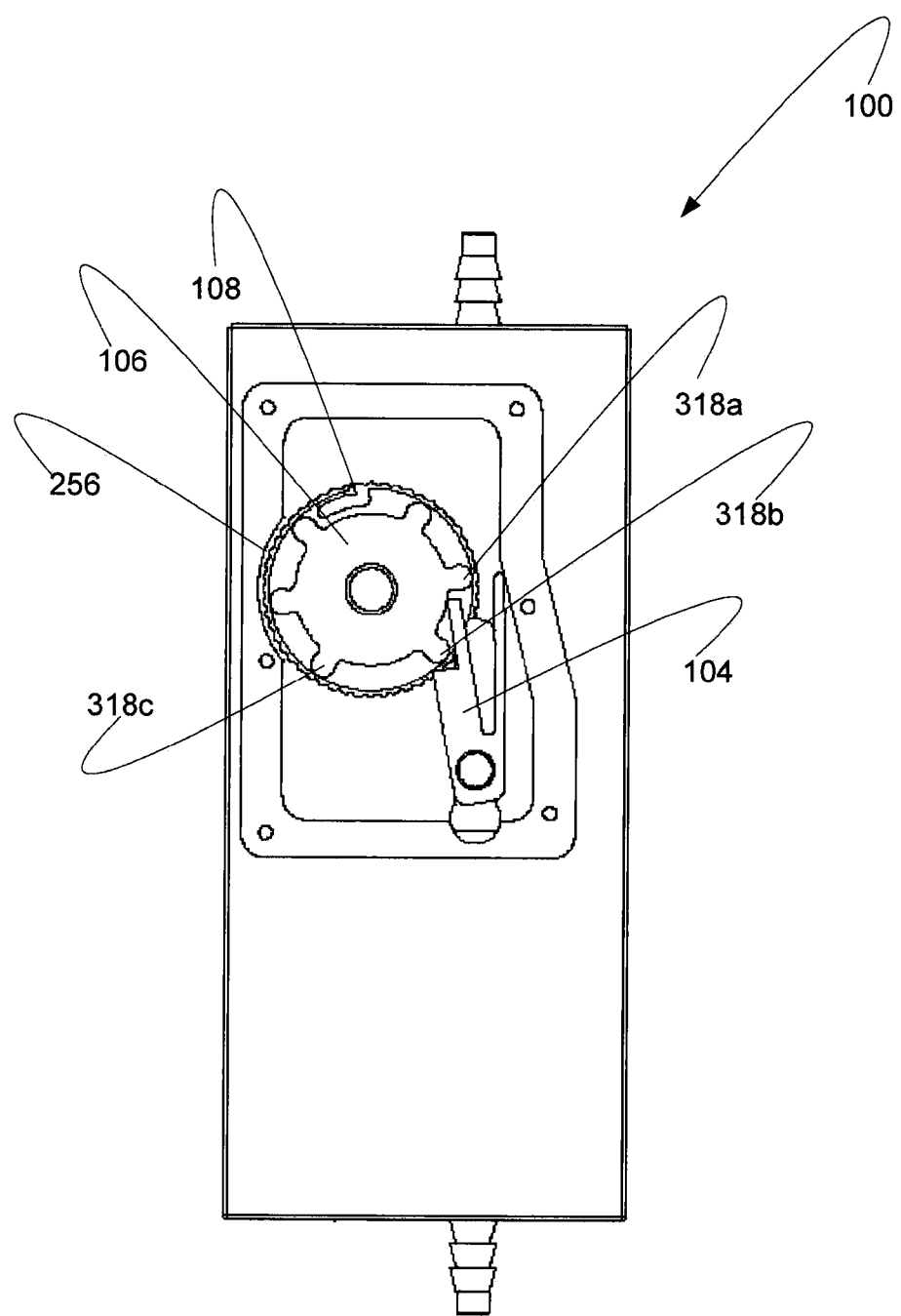
FIG. 8B is a front view of the passive cycle skipping valve of FIG. 8A.
Figure 10:
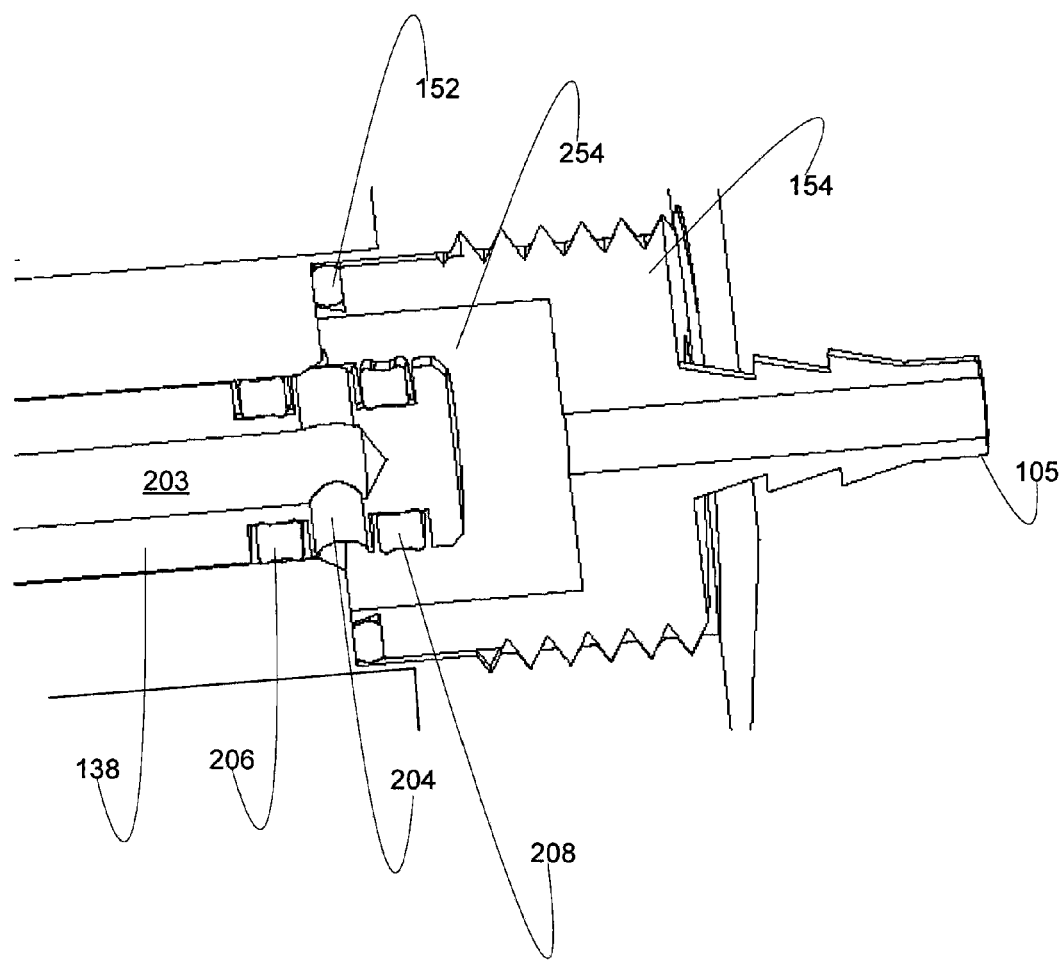
FIG. 10 depicts a cross-section of the piston rod assembly of FIG. 2 in the flow position.

As is shown in the illustrated embodiment of FIGS. 8A and 8B, when the supply line next pressurizes and pressure is applied to inlet fitting 146, piston 136 again moves towards outlet fitting 154. During the linear motion of piston rod assembly 132, notch 213 of pawl 104 engages pin 318(*b*) of indexing wheel 106, causing indexing wheel 106 to rotate counter-clockwise. This motion continues until pin 318(*c*) of indexing wheel 106 is pushed up against the side of pawl 104 as shown in FIGS. 9A, 9B, and 9C. This is referred to as the "flow position" of PCS valve 100. When in the flow position, o-ring 208 extends outwardly from piston rod bore 252 and into exit bore 254, allowing fluid to flow through piston rod assembly 132 into outlet fitting 154 and out of PCS valve 100 via a line connected to connection 105. FIG. 10 depicts a cross-section of piston rod assembly 132 in the flow position. As is illustrated in FIGS. 9A and 9C, o-ring 206 is maintained inside piston rod bore 252 preventing fluid flow back toward inlet fitting 146.

When Applicants' PCS valve 100 is in the flow position as shown in FIGS. 9A and 9B, flow will be maintained until the inlet pressure decreases below the pressure necessary to compress return spring 134 (depicted in FIG. 9C only for clarity). When the inlet pressure decreases, return spring 134 pushes piston rod assembly 132 back toward the home position. Anti-rotational spring 108 of indexing wheel 106 engages the ratcheted periphery 256 of counter-bore 156, preventing indexing wheel 106 from rotating in a clockwise direction during the retraction stroke of piston rod assembly 132.

The embodiment of PCS valve 100, as depicted in FIGS. 6A-9B, has two flow positions and four trapped positions, as is indicated by the positions of the pins of indexing wheel 106. Each time the supply line pressurizes and then depressurizes, valve 100 cycles through the flow and trapped positions described in connection with FIGS. 6A-9B.

As will be appreciated by one of ordinary skill in the art, the number of home positions, flow positions, and trapped positions is determined by the arrangement of the pins of indexing wheel 106, as the arrangement of pins dictates the cycle of PCS valve 100. The embodiment of PCS valve 100 depicted in FIGS. 6A-9B is a tertiary valve, meaning that the exit flow is allowed every third time inlet pressure is applied. As can be seen in FIG. 4A, which also depicts a tertiary valve, the spacing between pins 218(*a*)-218(*f*) varies, with the largest spacing, between pins 218(*c*) and 218(*d*) as well as 218(*f*) and 218(*a*). Thus, when pawl 104 engages pins 218(*a*) or 218(*d*), valve 100 will transition into the flow position.

Applicants' PCS valve 100 can produce any cycle desired based upon the positioning of the index wheel pins. Cycles can be both symmetrical (e.g., binary, tertiary, etc.) and asymmetrical. Examples cycles achievable with Applicants' valve 100 are presented in Table 1. Table 1 is illustrative only and not limiting.

TABLE 1

| Symmetrical Binary | On-Off-On-Off-On . . . |
|---|---|
| Symmetrical Tertiary | On-Off-Off-On-Off-Off-On . . . |
| Symmetrical Quertiary | On-Off-Off-Off-On-Off-Off-Off-On . . . |
| Symmetrical Tertiary | On-On-Off-On-On-Off . . . |
| Asymmetrical | On-Off-Off-On-Off-Off-Off-On . . . |
| Asymmetrical | On-On-Off-On-Off-Off-On . . . |

In certain embodiments, indexing wheel 106 is two sided, thus having a first set of pins on a first side and a second set of pins on a second side. In such an embodiment, a user can alter the cycle of PCS valve 100 by flipping indexing wheel 106. By way of example and not limitation, by flipping indexing wheel 106, a user could change PCS valve 100 from a binary cycle to a tertiary cycle. In certain embodiments, the pins of indexing wheel 106 are moveable. In such an embodiment, a user can set the cycle of PCS valve 100 by altering the spacing between the pins.

Figure 11A:
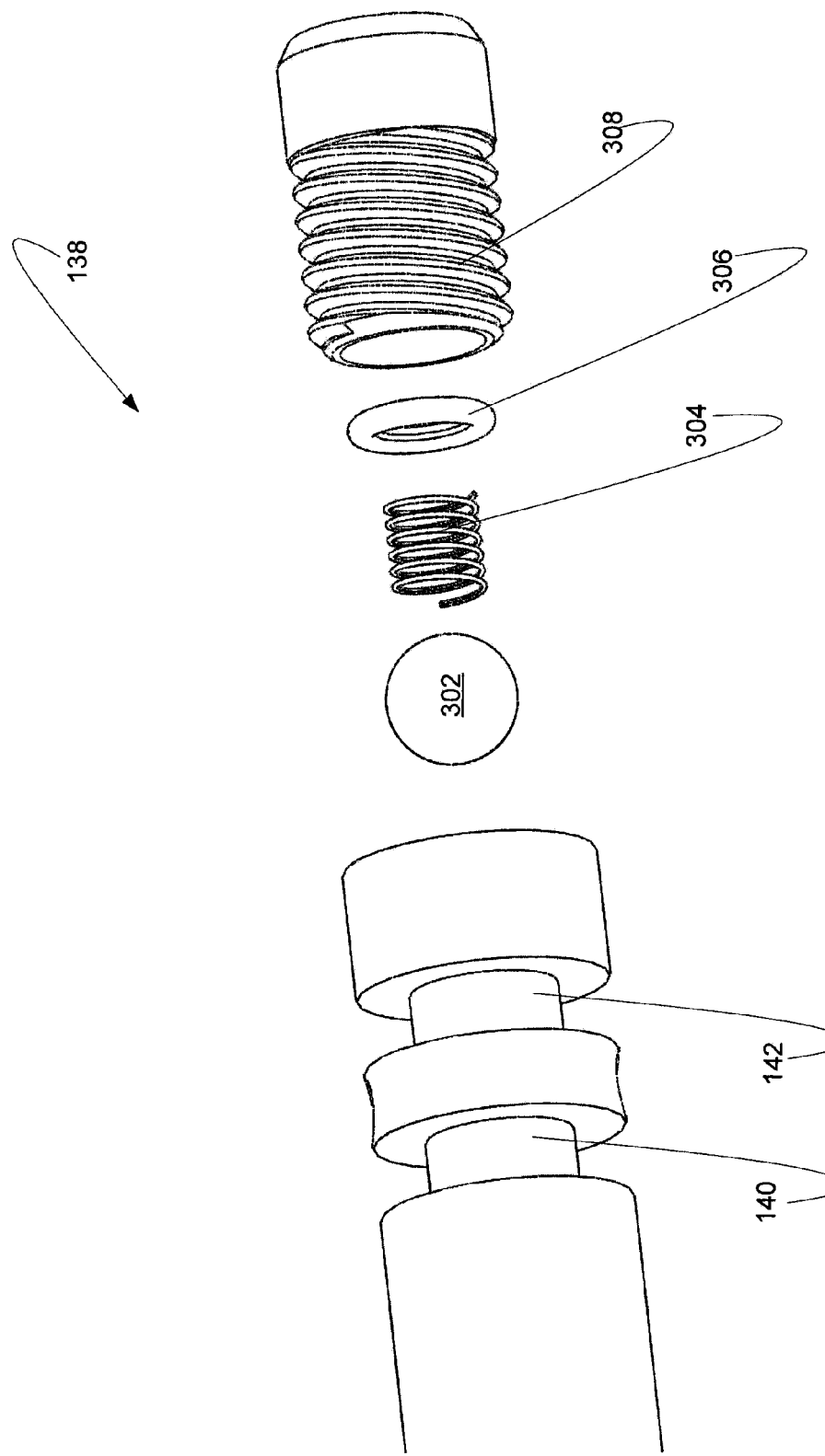
FIG. 11A is an exploded view of Applicants' self-drain feature.
Figure 11B:
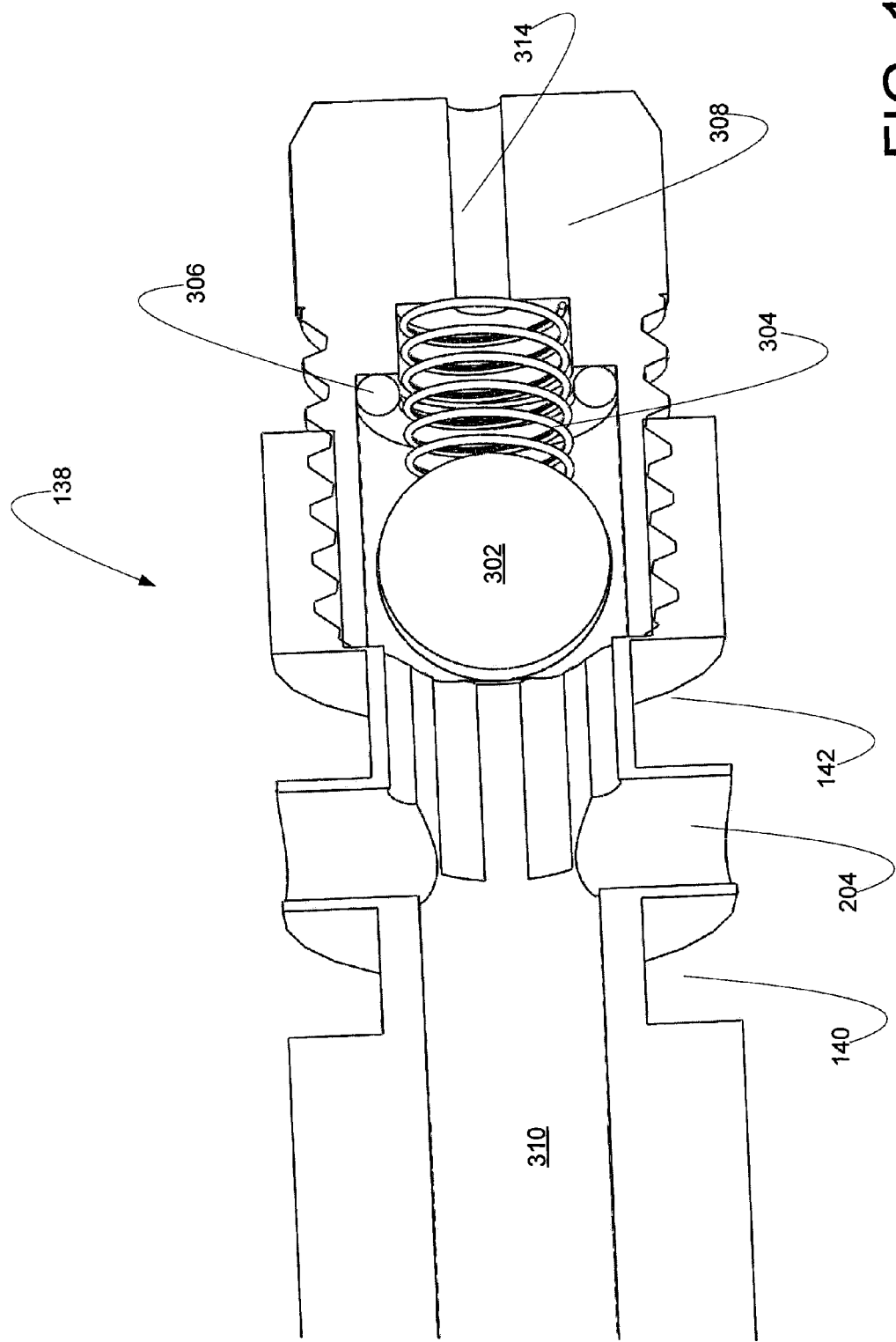
FIG. 11B is a cross-section view of the self-drain feature of FIG. 11A.

In certain embodiments, Applicants' PCS valve 100 further comprises a self-drain feature to allow bi-directional flow through valve 100 when the pressure in valve 100 is less than about 3 psi. By "about 3 psi," Applicants mean 3 psi plus or minus 5%. An exemplary embodiment of Applicants' self-drain feature is presented in FIGS. 11A-B. As can be seen in the illustrated embodiment of FIG. 11A, Applicants self-drain feature includes spherical bearing 302, spring 304, o-ring 306, and threaded drain cap 308, wherein drain cap 308 screws into a threaded bore located at the end of piston rod assembly 132 (illustrated in FIG. 11B). A cross-section view of Applicants' self-drain feature is presented in FIG. 11B. As can be seen in FIG. 11B, drain cap 308 further comprises drain 314.

When fluid pressure within piston rod assembly 132 is greater than about 3 psi, spherical bearing 302 will compress spring 304 until bearing 302 is against o-ring 306, preventing fluid from flowing through drain 314. As the pressure within piston rod assembly 132 decreases, spring 304 will decompress, allowing fluid to drain through drain 314.

A threshold of about 3 psi for fluid to drain from PCS valve 100 is exemplary only. Applicants' self-drain feature can be adjusted to drain at any pressure by adjusting the strength of spring 304.

Figure 12C:
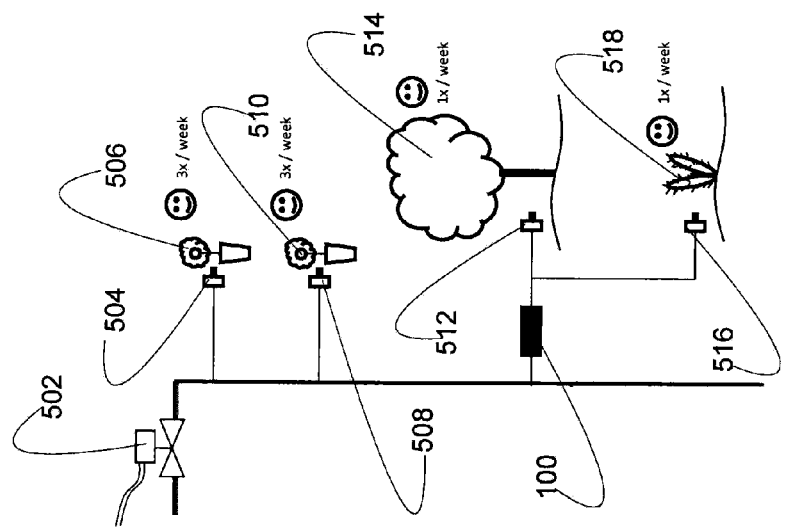
FIG. 12C is a block diagram of the installation of FIG. 12A including Applicants' passive cycle skipping valve.
Figure 12B:
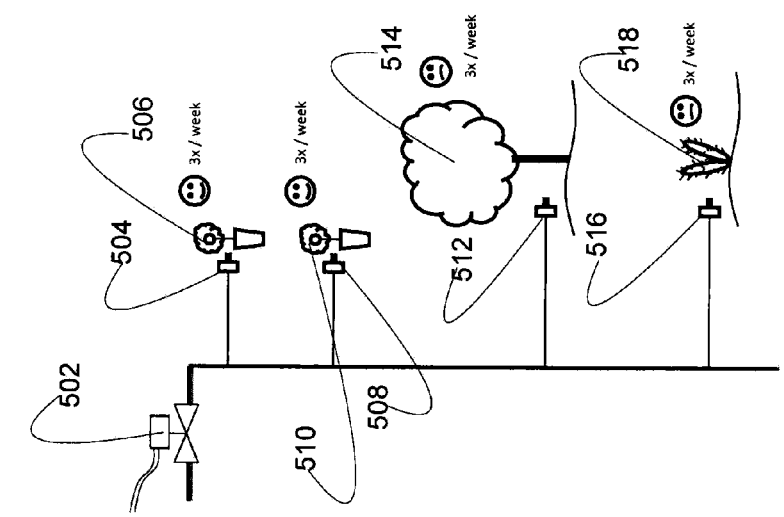
FIG. 12B is a block diagram of the installation of FIG. 12A illustrating the watering schedule of the depicted plants.
Figure 12A:
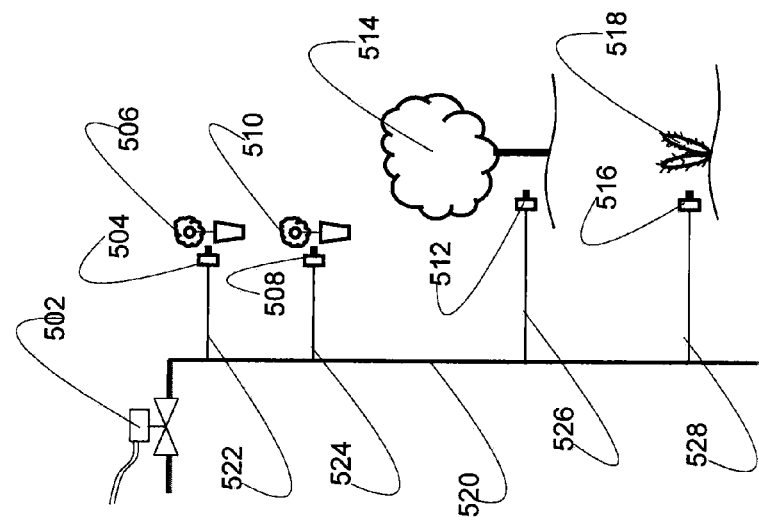
FIG. 12A is a block diagram of a typical installation of a drip circuit for plants.

Turning now to FIGS. 12A-C, an example of Applicants' PCS valve 100 is presented to further illustrate to persons skilled in the art how to make and use the invention. This example is not intended as a limitation, however, upon the scope of the invention, which is defined only by the appended claims.

By way of example and not limitation, FIG. 12A illustrates the typical installation of a drip circuit for plants comprising timer-operated solenoid valve 502, main line tubing 520, and branch tubing 522, 524, 526, and 528 connected to emitters 504, 508, 512, and 516 for watering plants 506, 510, 514, and 518. Plants 506, 510, 514, and 518 have a variety of irrigation needs and differ in terms of the volume of water needed and the frequency of watering cycles. Plants 506 and 510 are illustrated as container plants and need more frequent, lighter waterings. Plant 514 is an established tree and plant 518 is a cactus, both needing less frequent, deeper waterings than container plants 506 and 510. However, as can be seen in the illustrated embodiment of FIG. 12B, with the drip circuit illustrated, each plant receives the same amount of water at the same frequency. If sufficient water is provided to container plants 506 and 510 then plants 514 and 518 are overwatered. If this is compensated for by reducing the frequency of the waterings, plants 506 and 510 may not receive enough water.

As can be seen in FIG. 12C, by using Applicants' PCS valve 100 plants 506 and 510 can be watered frequently while plants 514 and 518 receive fewer waterings without altering the drip circuit. The embodiment of PCS valve 100 illustrated in FIG. 12C has a cycle interval ratio of 3:1, meaning there are three pressure cycles per output of valve 100. Thus, if plants 506 and 510 are watered, by way of example and not limitation, three times per week, plants 514 and 518 will only receive water once per week.

Figure 13:
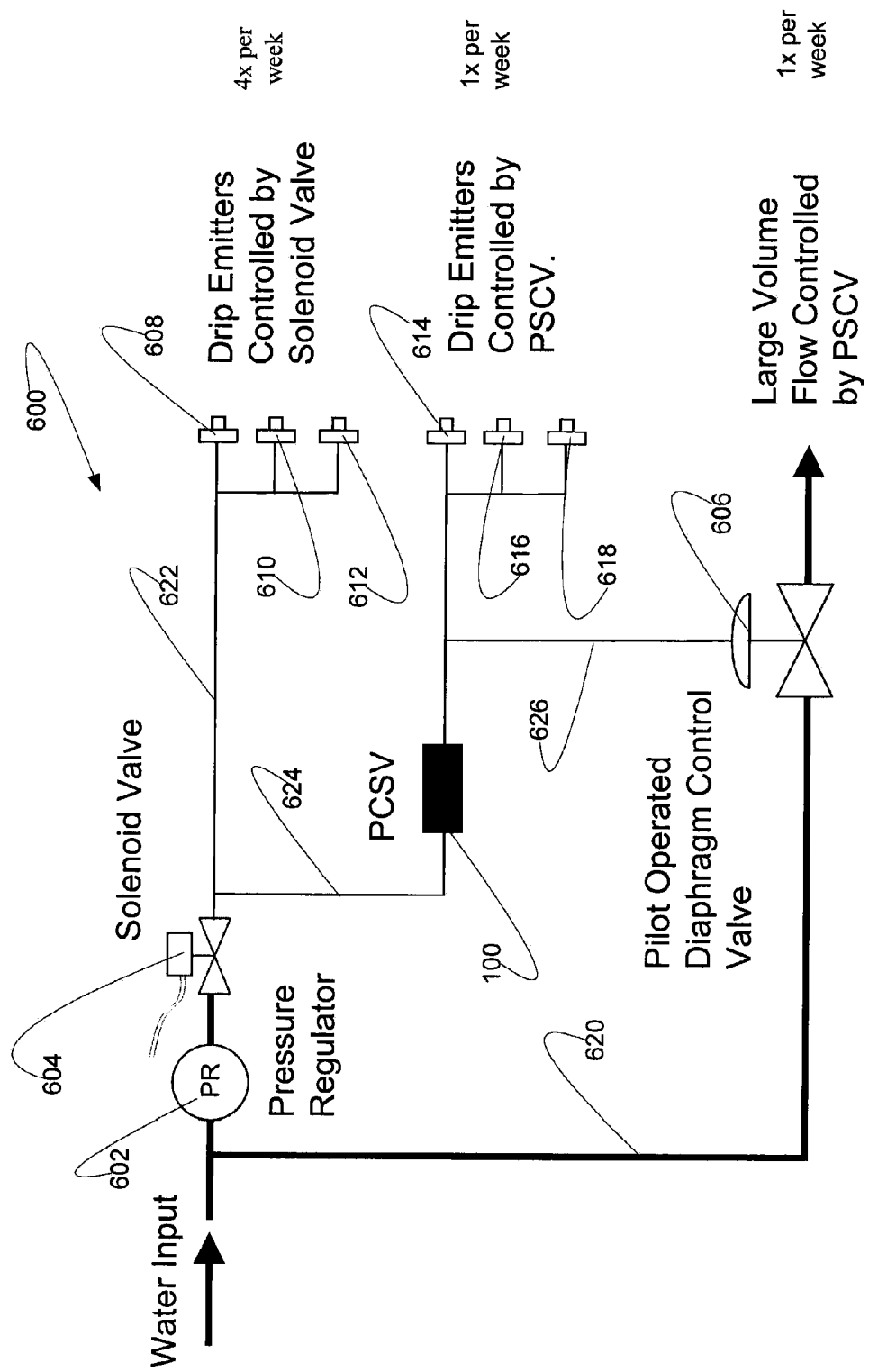
FIG. 13 is a block diagram of an exemplary system wherein Applicants' passive cycle skipping valve is used to control a large piloted valve.

FIG. 13 presents an exemplary system wherein Applicants' PCS valve 100 is used to control a large piloted valve. As will be appreciated by one of ordinary skill in the art, a pilot valve is a small valve that controls a limited-flow control feed to a separate piloted valve, the piloted valve controlling a high pressure or high flow feed. Pilot valves are useful because they allow a small and easily operated feed to control a much higher pressure or higher flow feed, which would otherwise require a much larger force to operate.

In the illustrated embodiment of FIG. 13, drip circuit 600 comprises main line 620, which connects to both pressure regulator 602 and pilot operated diaphragm control valve 606, solenoid valve 604, PCS valve 100, branch lines 622, 624, and 626, and emitters 608, 610, 612, 614, 616, and 618. Emitters 608, 610, and 612 are controlled by solenoid valve 604 where emitters 614, 616, and 618 and pilot operated diaphragm control valve 606 is controlled by PCS valve 100. Thus, in the illustrated embodiment of FIG. 13, emitters 608, 610, and 612 will emit flow each time fluid is inputted into lines 622 and 624, where emitters 614, 616, and 618 and diaphragm control valve 606 will emit fluid based on the cycle interval ratio of PCS valve 100 even though line 620 to diaphragm control valve 606 is always pressurized. As is shown, PCS valve 100 in FIG. 13 has a cycle interval ratio of 4:1. Thus, if water is input into lines 622 and 624 four times per week, flow will be allowed to emitters 614, 616, and 618 and diaphragm control valve 606 only once per week.

Figure 14:
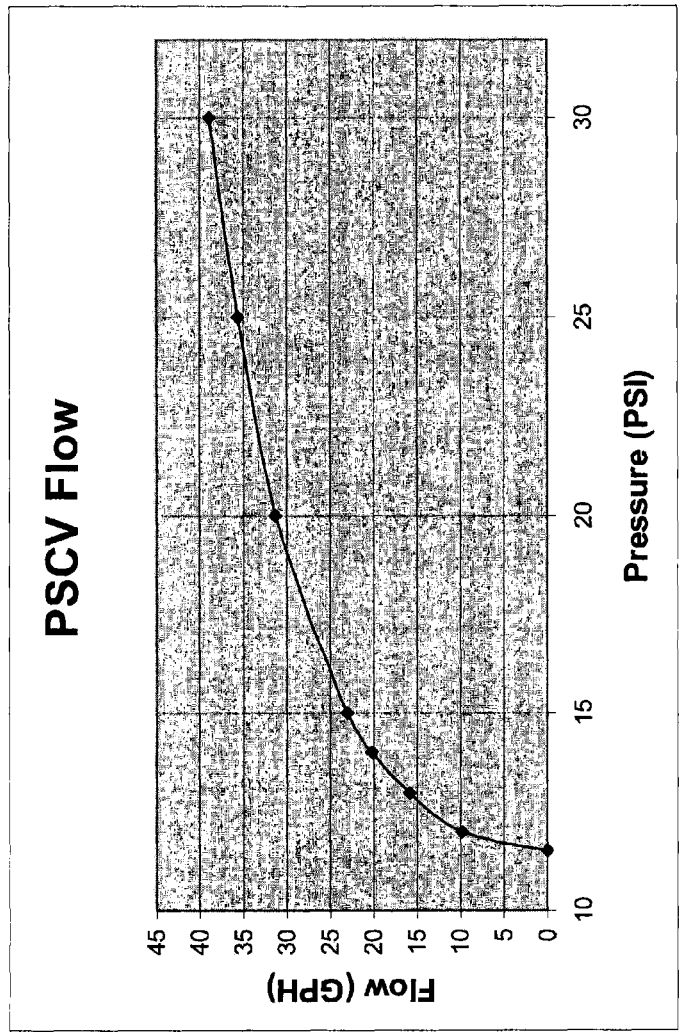
FIG. 14 is a graph illustrating the flow from Applicants' passive cycle skipping valve in gallons per hour under various fluid pressures.

Turning to FIG. 14, Applicants' PCS valve 100 has been tested under a variety of conditions. FIG. 14 illustrates the flow, in gallons per hour, from Applicants' PCS valve 100 under various fluid pressures. As is shown, at 11.5 psi, Applicants' PCS valve 100 opens and flow begins. The pressure at which valve 100 begins to allow flow at is dependent upon the strength of return spring 134. By using springs of different strength, the pressure needed to operate valve 100 can be varied.

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

While the preferred embodiments of the present invention have been illustrated in detail, it should be apparent that modifications and adaptations to those embodiments may occur to one skilled in the art without departing from the scope of the present invention as set forth in the following claims.

We claim:

1. A passive cycle skipping valve comprising:
a pawl;
a wheel comprising a plurality of pins, wherein a distal end of the pawl is configured to engage any of the plurality of pins;
wherein:
when a second pin is separated from a first pin by at least a threshold pin separation distance, the valve opens; and
when the second pin is not separated from the first pin by at least the threshold pin separation distance, the valve does not open;
a piston rod assembly, wherein a proximal end of the pawl is pivotally attached to the piston rod assembly; and
a housing having a cavity, wherein the piston rod assembly is located within the cavity, wherein the cavity comprises a first chamber and a second chamber, wherein, when the valve is open, the piston rod assembly extends from the first chamber into the second chamber and fluidly connects the first chamber to the second chamber.

2. The passive cycle skipping valve of claim 1, wherein the piston rod assembly further comprises:
a piston;
a rod connected to the piston; and
a spring surrounding the rod, wherein, when the valve is open, the spring is compressed.

3. The passive cycle skipping valve of claim 1, wherein the piston rod assembly further comprises a first passage and a second passage, wherein the first passage intersects the second passage, wherein, when the valve is open, the first passage and the second passage fluidly connects the first chamber to the second chamber.

4. The passive cycle skipping valve of claim 1, further comprising a diaphragm rod assembly, wherein a proximal end of the pawl is pivotally attached to the piston rod assembly.

5. The passive cycle skipping valve of claim 4, wherein the diaphragm rod assembly further comprises:
a diaphragm;
a rod connected to the diaphragm; and
a spring surrounding the rod, wherein, when the valve is open, the spring is compressed.

6. The passive cycle skipping valve of claim 5, further comprising a housing having a cavity, wherein the diaphragm rod is located within the cavity, wherein the cavity comprises a first chamber, wherein the diaphragm rod further comprises a diaphragm housing enclosing the diaphragm and forming a second chamber, wherein when the valve is open, the diaphragm rod assembly fluidly connects the first chamber to the second chamber.

7. The passive cycle skipping valve of claim 6, wherein the diaphragm rod assembly further comprises a first passage and a second passage, wherein the first passage intersects the second passage, wherein, when the valve is open, the first passage and the second passage fluidly connects the first chamber to the second chamber.

8. The passive cycle skipping valve of claim 1, further comprising a housing having a first bore comprising a counter-bore having a periphery that is ratcheted, wherein the indexing wheel further comprises a spring to engage the periphery.

9. The passive cycle skipping valve of claim 1, wherein the pawl further comprises a spring, wherein the spring is compressed when the valve is open.

10. The passive cycle skipping valve of claim 1, wherein a position of each of the plurality of pins is adjustable.

11. The passive cycle skipping valve of claim 1, further comprising a self-draining assembly, wherein, when a pressure within the valve is less than a threshold, the self-draining assembly opens.

12. The passive cycle skipping valve of claim 1, wherein an output pattern of the valve is asymmetrical.

13. A system comprising:
a passive cycle skipping valve comprising:
a pawl;
a wheel comprising a plurality of pins, wherein a distal end of the pawl is configured to engage any of the plurality of pins;
wherein:
when a second pin is separated from a first pin by at least a threshold pin separation distance, the valve opens; and
when the second pin is not separated from the first pin by at least the threshold pin separation distance, the valve does not open;
a piston rod assembly comprising:
a piston;
a rod connected to the piston; and
a spring surrounding the rod, wherein, when the passive cycle skipping valve is open, the spring is compressed, wherein a proximal end of the pawl is pivotally attached to the piston rod assembly; and
a housing having a cavity, wherein the piston rod assembly is located within the cavity, wherein the cavity comprises a first chamber and a second chamber, wherein, when the passive cycle skipping valve is open, the piston rod assembly extends from the first chamber into the second chamber and fluidly connects the first chamber to the second chamber; and
a plurality of fluid emitters, wherein the passive cycle skipping valve controls the emission of at least one of the plurality of fluid emitters.

14. The system of claim 13, wherein the piston rod assembly further comprises a first passage and a second passage, wherein the first passage intersects the second passage, wherein, when the passive cycle skipping valve is open, the first passage and the second passage fluidly connects the first chamber to the second chamber.

15. The system of claim 13, wherein the passive cycle skipping valve further comprises a diaphragm rod assembly, wherein a proximal end of the pawl is pivotally attached to the diaphragm rod assembly.

16. The system of claim 15, wherein the diaphragm rod assembly further comprises:
a diaphragm;
a rod connected to the diaphragm; and
a spring surrounding the rod, wherein, when the valve is open, the spring is compressed.

17. The system of claim 16, wherein the passive cycle skipping valve further comprises a housing having a cavity, wherein the diaphragm rod is located within the cavity, wherein the cavity comprises a first chamber, wherein the diaphragm rod further comprises a diaphragm housing enclosing the diaphragm and forming a second chamber, wherein when the valve is open, the diaphragm rod assembly fluidly connects the first chamber to the second chamber.

18. The system of claim 17, wherein the diaphragm rod assembly further comprises a first passage and a second passage, wherein the first passage intersects the second passage, wherein, when the valve is open, the first passage and the second passage fluidly connects the first chamber to the second chamber.

19. The system of claim 13, wherein the passive cycle skipping valve further comprises a housing having a first bore comprising a counter-bore having a periphery that is ratcheted, wherein the indexing wheel further comprises a spring to engage the periphery.

20. The system of claim 13, wherein the pawl further comprises an spring, wherein the spring is compressed when the passive cycle skipping valve is open.

21. The passive cycle skipping valve of claim 13, wherein a position of each of the plurality of pins is adjustable.

22. The system of claim 13, wherein the passive cycle skipping valve further comprises a self-draining assembly, wherein, when a pressure within the passive cycle skipping valve is less than a threshold, the self-draining assembly opens.

23. The system of claim 13, wherein an output pattern of the passive cycle skipping valve is asymmetrical.

24. The system of claim 13, further comprising a diaphragm valve, wherein the valve actuates the diaphragm valve.

25. The system of claim 13, further comprising a solenoid valve.

26. The system of claim 25, wherein the solenoid valve is operated by a timer.

27. A method to deliver a fluid from a pressurized line while skipping one or more pressure cycles, comprising:
disposing on a distal end of a conduit conveying a fluid having a first pressure, a passive cycle skipping valve comprising:
a pawl;
a wheel comprising a plurality of pins, wherein a distal end of said pawl engages a first pin of the plurality of pins;
a piston rod assembly, wherein a proximal end of the pawl is pivotally attached to the piston rod assembly; and
a housing having a cavity, wherein the piston rod assembly is located within the cavity, wherein the cavity comprises a first chamber and a second chamber, wherein, when the valve is open, the piston rod assembly extends from the first chamber into the second chamber and fluidly connects the first chamber to the second chamber;
rotating the wheel until a second pin of the plurality of pins contacts the pawl;
opening the valve when the second pin is separated from the first pin by at least a threshold pin separation distance; and
not opening the valve when the second pin is not separated from the first pin by at least said threshold pin separation distance.

28. The method of claim 27, wherein the passive cycle skipping valve further comprises a diaphragm rod assembly, wherein a proximal end of the pawl is pivotally attached to the diaphragm rod assembly, and a housing having a cavity, wherein the diaphragm rod assembly is located within the cavity, wherein the cavity comprises a first chamber and a second chamber, the method further comprising, when the valve is open, extending the diaphragm rod assembly from the first chamber into the second chamber.

29. The method of claim 27, wherein a position of each of the plurality of pins is adjustable, the method further comprising setting the position of each of the plurality of pins.

* * * * *